US009164952B2

(12) United States Patent
Master et al.

(10) Patent No.: US 9,164,952 B2
(45) Date of Patent: *Oct. 20, 2015

(54) ADAPTIVE INTEGRATED CIRCUITRY WITH HETEROGENEOUS AND RECONFIGURABLE MATRICES OF DIVERSE AND ADAPTIVE COMPUTATIONAL UNITS HAVING FIXED, APPLICATION SPECIFIC COMPUTATIONAL ELEMENTS

(71) Applicant: Altera Corporation, San Jose, CA (US)

(72) Inventors: Paul L. Master, Sunnyvale, CA (US); Eugene Hogenauer, San Francisco, CA (US); Walter J. Scheuermann, Saratoga, CA (US)

(73) Assignee: Altera Corporation, San Jose, CA (US)

( * ) Notice: Subject to any disclaimer, the term of this patent is extended or adjusted under 35 U.S.C. 154(b) by 17 days.

This patent is subject to a terminal disclaimer.

(21) Appl. No.: 14/035,067

(22) Filed: Sep. 24, 2013

(65) Prior Publication Data

US 2014/0122764 A1 May 1, 2014

Related U.S. Application Data

(63) Continuation of application No. 13/353,764, filed on Jan. 19, 2012, now Pat. No. 8,543,795, which is a (Continued)

(51) Int. Cl.
*G06F 15/00* (2006.01)
*G06F 15/76* (2006.01)
(Continued)

(52) U.S. Cl.
CPC ........ *G06F 15/7867* (2013.01); *G06F 13/4027* (2013.01); *Y02B 60/1207* (2013.01); *Y02B 60/1225* (2013.01)

(58) Field of Classification Search
None
See application file for complete search history.

(56) References Cited

U.S. PATENT DOCUMENTS 3,409,175 A 11/1968 Byrne
3,665,171 A 5/1972 Morrow
(Continued)

FOREIGN PATENT DOCUMENTS

DE 10018374 10/2001
EP 0301169 2/1989
(Continued)

OTHER PUBLICATIONS

Abnous et al., "Ultra-Low-Power Domain-Specific Multimedia Processors," VLSI Signal Processing, IX, 1998, IEEE Workshop in San Francisco, CA, USA, Oct. 30-, Nov. 1, 1998, pp. 461-470 (Oct. 30, 1998).

(Continued)

*Primary Examiner* — William B Partridge
(74) *Attorney, Agent, or Firm* — Nixon Peabody LLP

(57) ABSTRACT

The present invention concerns a new category of integrated circuitry and a new methodology for adaptive or reconfigurable computing. The preferred IC embodiment includes a plurality of heterogeneous computational elements coupled to an interconnection network. The plurality of heterogeneous computational elements include corresponding computational elements having fixed and differing architectures, such as fixed architectures for different functions such as memory, addition, multiplication, complex multiplication, subtraction, configuration, reconfiguration, control, input, output, and field programmability. In response to configuration information, the interconnection network is operative in real-time to configure and reconfigure the plurality of heterogeneous computational elements for a plurality of different functional modes, including linear algorithmic operations, non-linear algorithmic operations, finite state machine operations, memory operations, and bit-level manipulations. The various fixed architectures are selected to comparatively minimize power consumption and increase performance of the adaptive computing integrated circuit, particularly suitable for mobile, hand-held or other battery-powered computing applications.

22 Claims, 17 Drawing Sheets

Related U.S. Application Data continuation of application No. 12/251,903, filed on Oct. 15, 2008, now Pat. No. 8,533,431, which is a continuation of application No. 10/990,800, filed on Nov. 17, 2004, now Pat. No. 7,962,716, which is a continuation of application No. 09/815,122, filed on Mar. 22, 2001, now Pat. No. 6,836,839.

(51) Int. Cl.
*G06F 15/78* (2006.01)
*G06F 13/40* (2006.01)

(56) References Cited

U.S. PATENT DOCUMENTS

| | | |
|---|---|---|
| 3,666,143 A | 5/1972 | Weston |
| 3,938,639 A | 2/1976 | Birrell |
| 3,949,903 A | 4/1976 | Benasutti et al. |
| 3,960,298 A | 6/1976 | Birrell |
| 3,967,062 A | 6/1976 | Dobias |
| 3,991,911 A | 11/1976 | Shannon et al. |
| 3,995,441 A | 12/1976 | McMillin |
| 4,076,145 A | 2/1978 | Zygiel |
| 4,143,793 A | 3/1979 | McMillin et al. |
| 4,172,669 A | 10/1979 | Edelbach |
| 4,174,872 A | 11/1979 | Fessler |
| 4,181,242 A | 1/1980 | Zygiel et al. |
| RE30,301 E | 6/1980 | Zygiel |
| 4,218,014 A | 8/1980 | Tracy |
| 4,222,972 A | 9/1980 | Caldwell |
| 4,237,536 A | 12/1980 | Enelow et al. |
| 4,252,253 A | 2/1981 | Shannon |
| 4,302,775 A | 11/1981 | Widergren et al. |
| 4,333,587 A | 6/1982 | Fessler et al. |
| 4,354,613 A | 10/1982 | Desai et al. |
| 4,377,246 A | 3/1983 | McMillin et al. |
| 4,380,046 A | 4/1983 | Fung et al. |
| 4,393,468 A | 7/1983 | New |
| 4,413,752 A | 11/1983 | McMillin et al. |
| 4,458,584 A | 7/1984 | Annese et al. |
| 4,466,342 A | 8/1984 | Basile et al. |
| 4,475,448 A | 10/1984 | Shoaf et al. |
| 4,509,690 A | 4/1985 | Austin et al. |
| 4,520,950 A | 6/1985 | Jeans |
| 4,549,675 A | 10/1985 | Austin |
| 4,553,573 A | 11/1985 | McGarrah |
| 4,560,089 A | 12/1985 | McMillin et al. |
| 4,577,782 A | 3/1986 | Fessler |
| 4,578,799 A | 3/1986 | Scholl et al. |
| RE32,179 E | 6/1986 | Sedam et al. |
| 4,633,386 A | 12/1986 | Terepin et al. |
| 4,649,512 A | 3/1987 | Nukiyama |
| 4,658,988 A | 4/1987 | Hassell |
| 4,694,416 A * | 9/1987 | Wheeler et al. ............... 708/408 |
| 4,711,374 A | 12/1987 | Gaunt et al. |
| 4,713,755 A | 12/1987 | Worley, Jr. et al. |
| 4,719,056 A | 1/1988 | Scott |
| 4,726,494 A | 2/1988 | Scott |
| 4,747,516 A | 5/1988 | Baker |
| 4,748,585 A | 5/1988 | Chiarulli et al. |
| 4,758,985 A | 7/1988 | Carter |
| 4,760,525 A | 7/1988 | Webb |
| 4,760,544 A | 7/1988 | Lamb |
| 4,765,513 A | 8/1988 | McMillin et al. |
| 4,766,548 A | 8/1988 | Cedrone et al. |
| 4,781,309 A | 11/1988 | Vogel |
| 4,800,492 A | 1/1989 | Johnson et al. |
| 4,811,214 A | 3/1989 | Nosenchuck et al. |
| 4,824,075 A | 4/1989 | Holzboog |
| 4,827,426 A | 5/1989 | Patton et al. |
| 4,850,269 A | 7/1989 | Hancock et al. |
| 4,856,684 A | 8/1989 | Gerstung |
| 4,870,302 A | 9/1989 | Freeman |
| 4,901,887 A | 2/1990 | Burton |
| 4,905,231 A | 2/1990 | Leung et al. |
| 4,921,315 A | 5/1990 | Metcalfe et al. |
| 4,930,666 A | 6/1990 | Rudick |
| 4,932,564 A | 6/1990 | Austin et al. |
| 4,936,488 A | 6/1990 | Austin |
| 4,937,019 A | 6/1990 | Scott |
| 4,960,261 A | 10/1990 | Scott et al. |
| 4,961,533 A | 10/1990 | Teller et al. |
| 4,967,340 A | 10/1990 | Dawes |
| 4,974,643 A | 12/1990 | Bennett et al. |
| 4,982,876 A | 1/1991 | Scott |
| 4,993,604 A | 2/1991 | Gaunt et al. |
| 5,007,560 A | 4/1991 | Sassak |
| 5,021,947 A | 6/1991 | Campbell et al. |
| 5,040,106 A | 8/1991 | Maag |
| 5,044,171 A | 9/1991 | Farkas |
| 5,090,015 A | 2/1992 | Dabbish et al. |
| 5,099,418 A | 3/1992 | Pian et al. |
| 5,129,549 A | 7/1992 | Austin |
| 5,139,708 A | 8/1992 | Scott |
| 5,144,166 A | 9/1992 | Camarota et al. |
| 5,156,301 A | 10/1992 | Hassell et al. |
| 5,156,871 A | 10/1992 | Goulet et al. |
| 5,165,023 A | 11/1992 | Gifford |
| 5,165,575 A | 11/1992 | Scott |
| 5,177,700 A | 1/1993 | Göckler |
| 5,190,083 A | 3/1993 | Gupta et al. |
| 5,190,189 A | 3/1993 | Zimmer et al. |
| 5,193,151 A | 3/1993 | Jain |
| 5,193,718 A | 3/1993 | Hassell et al. |
| 5,202,993 A | 4/1993 | Tarsy et al. |
| 5,203,474 A | 4/1993 | Haynes |
| 5,218,240 A | 6/1993 | Camarota et al. |
| 5,240,144 A | 8/1993 | Feldman |
| 5,245,227 A | 9/1993 | Furtek et al. |
| 5,261,099 A | 11/1993 | Bigo et al. |
| 5,263,509 A | 11/1993 | Cherry et al. |
| 5,269,442 A | 12/1993 | Vogel |
| 5,280,711 A | 1/1994 | Motta et al. |
| 5,297,400 A | 3/1994 | Benton et al. |
| 5,301,100 A | 4/1994 | Wagner |
| 5,303,846 A | 4/1994 | Shannon |
| 5,335,276 A | 8/1994 | Thompson et al. |
| 5,336,950 A | 8/1994 | Popli et al. |
| 5,339,428 A | 8/1994 | Burmeister et al. |
| 5,343,716 A | 9/1994 | Swanson et al. |
| 5,361,362 A | 11/1994 | Benkeser et al. |
| 5,368,198 A | 11/1994 | Goulet |
| 5,379,343 A | 1/1995 | Grube et al. |
| 5,381,546 A | 1/1995 | Servi et al. |
| 5,381,550 A | 1/1995 | Jourdenais et al. |
| 5,388,062 A | 2/1995 | Knutson |
| 5,388,212 A | 2/1995 | Grube et al. |
| 5,392,960 A | 2/1995 | Kendt et al. |
| 5,428,754 A | 6/1995 | Baldwin |
| 5,437,395 A | 8/1995 | Bull et al. |
| 5,450,557 A | 9/1995 | Kopp et al. |
| 5,454,406 A | 10/1995 | Rejret et al. |
| 5,465,368 A | 11/1995 | Davidson et al. |
| 5,475,856 A | 12/1995 | Kogge |
| 5,479,055 A | 12/1995 | Eccles |
| 5,490,165 A | 2/1996 | Blakeney, II et al. |
| 5,491,823 A | 2/1996 | Ruttenberg |
| 5,507,009 A | 4/1996 | Grube et al. |
| 5,515,519 A | 5/1996 | Yoshioka et al. |
| 5,517,600 A | 5/1996 | Shimokawa |
| 5,519,694 A | 5/1996 | Brewer et al. |
| 5,522,070 A | 5/1996 | Sumimoto |
| 5,530,964 A | 6/1996 | Alpert et al. |
| 5,534,796 A | 7/1996 | Edwards |
| 5,542,265 A | 8/1996 | Rutland |
| 5,553,755 A | 9/1996 | Bonewald et al. |
| 5,555,417 A | 9/1996 | Odnert et al. |
| 5,560,028 A | 9/1996 | Sachs et al. |
| 5,560,038 A | 9/1996 | Haddock |
| 5,570,587 A | 11/1996 | Kim |
| 5,572,572 A | 11/1996 | Kawan et al. |
| 5,590,353 A | 12/1996 | Sakakibara et al. |
| 5,594,657 A | 1/1997 | Cantone et al. |
| 5,600,810 A | 2/1997 | Ohkami |

(56) References Cited

U.S. PATENT DOCUMENTS

| | | | |
|---|---|---|---|
| 5,600,844 A | 2/1997 | Shaw et al. | |
| 5,600,845 A * | 2/1997 | Gilson | 712/39 |
| 5,602,833 A | 2/1997 | Zehavi | |
| 5,603,043 A | 2/1997 | Taylor et al. | |
| 5,607,083 A | 3/1997 | Vogel et al. | |
| 5,608,643 A | 3/1997 | Wichter et al. | |
| 5,611,867 A | 3/1997 | Cooper et al. | |
| 5,623,545 A | 4/1997 | Childs et al. | |
| 5,625,669 A | 4/1997 | McGregor et al. | |
| 5,626,407 A | 5/1997 | Westcott | |
| 5,630,206 A | 5/1997 | Urban et al. | |
| 5,635,940 A | 6/1997 | Hickman et al. | |
| 5,646,544 A | 7/1997 | Iadanza | |
| 5,646,545 A | 7/1997 | Trimberger et al. | |
| 5,647,512 A | 7/1997 | Assis Mascarenhas de Oliveira et al. | |
| 5,667,110 A | 9/1997 | McCann et al. | |
| 5,684,793 A | 11/1997 | Kiema et al. | |
| 5,684,980 A | 11/1997 | Casselman | |
| 5,687,236 A | 11/1997 | Moskowitz et al. | |
| 5,694,613 A | 12/1997 | Suzuki | |
| 5,694,794 A | 12/1997 | Jerg et al. | |
| 5,699,328 A | 12/1997 | Ishizaki et al. | |
| 5,701,398 A | 12/1997 | Glier et al. | |
| 5,701,482 A | 12/1997 | Harrison et al. | |
| 5,704,053 A | 12/1997 | Santhanam | |
| 5,706,191 A | 1/1998 | Bassett et al. | |
| 5,706,976 A | 1/1998 | Purkey | |
| 5,712,996 A | 1/1998 | Schepers | |
| 5,720,002 A | 2/1998 | Wang | |
| 5,721,693 A | 2/1998 | Song | |
| 5,721,854 A | 2/1998 | Ebicioglu et al. | |
| 5,729,754 A | 3/1998 | Estes | |
| 5,732,563 A | 3/1998 | Bethuy et al. | |
| 5,734,808 A | 3/1998 | Takeda | |
| 5,737,631 A | 4/1998 | Trimberger | |
| 5,742,180 A | 4/1998 | DeHon et al. | |
| 5,742,821 A | 4/1998 | Prasanna | |
| 5,745,366 A | 4/1998 | Highma et al. | |
| RE35,780 E | 5/1998 | Hassell et al. | |
| 5,751,295 A | 5/1998 | Becklund et al. | |
| 5,754,227 A | 5/1998 | Fukuoka | |
| 5,758,261 A | 5/1998 | Weideman | |
| 5,768,561 A | 6/1998 | Wise | |
| 5,771,362 A | 6/1998 | Bartkowiak et al. | |
| 5,778,439 A | 7/1998 | Trimberger et al. | |
| 5,784,636 A | 7/1998 | Rupp | |
| 5,784,699 A | 7/1998 | McMahon et al. | |
| 5,787,237 A | 7/1998 | Reilly | |
| 5,790,817 A | 8/1998 | Asghar et al. | |
| 5,791,517 A | 8/1998 | Avital | |
| 5,791,523 A | 8/1998 | Oh | |
| 5,794,062 A | 8/1998 | Baxter | |
| 5,794,067 A | 8/1998 | Kadowaki | |
| 5,802,055 A | 9/1998 | Krein et al. | |
| 5,802,278 A | 9/1998 | Isfeld et al. | |
| 5,818,603 A | 10/1998 | Motoyama | |
| 5,822,308 A | 10/1998 | Weigand et al. | |
| 5,822,313 A | 10/1998 | Malek et al. | |
| 5,822,360 A | 10/1998 | Lee et al. | |
| 5,828,858 A | 10/1998 | Athanas et al. | |
| 5,829,085 A | 11/1998 | Jerg et al. | |
| 5,835,753 A | 11/1998 | Witt | |
| 5,838,165 A | 11/1998 | Chatter | |
| 5,838,894 A | 11/1998 | Horst | |
| 5,845,815 A | 12/1998 | Vogel | |
| 5,860,021 A | 1/1999 | Klingman | |
| 5,862,961 A | 1/1999 | Motta et al. | |
| 5,870,427 A | 2/1999 | Tiedemann, Jr. et al. | |
| 5,873,045 A | 2/1999 | Lee et al. | |
| 5,881,106 A | 3/1999 | Cartier | |
| 5,884,284 A | 3/1999 | Peters et al. | |
| 5,886,537 A | 3/1999 | Macias et al. | |
| 5,887,174 A | 3/1999 | Simons et al. | |
| 5,889,816 A * | 3/1999 | Agrawal et al. | 375/220 |
| 5,890,014 A | 3/1999 | Long | |
| 5,892,900 A | 4/1999 | Ginter et al. | |
| 5,892,961 A | 4/1999 | Trimberger | |
| 5,892,962 A | 4/1999 | Cloutier | |
| 5,894,473 A | 4/1999 | Dent | |
| 5,901,884 A | 5/1999 | Goulet et al. | |
| 5,903,886 A | 5/1999 | Heimlich et al. | |
| 5,907,285 A | 5/1999 | Toms et al. | |
| 5,907,580 A | 5/1999 | Cummings | |
| 5,910,733 A * | 6/1999 | Bertolet et al. | 326/41 |
| 5,912,572 A | 6/1999 | Graf, III | |
| 5,913,172 A | 6/1999 | McCabe et al. | |
| 5,917,852 A | 6/1999 | Butterfield et al. | |
| 5,920,801 A | 7/1999 | Thomas et al. | |
| 5,931,918 A | 8/1999 | Row et al. | |
| 5,933,642 A | 8/1999 | Greenbaum et al. | |
| 5,940,438 A | 8/1999 | Poon et al. | |
| 5,949,415 A | 9/1999 | Lin et al. | |
| 5,950,011 A | 9/1999 | Albrecht et al. | |
| 5,950,131 A | 9/1999 | Vilmur | |
| 5,951,674 A | 9/1999 | Moreno | |
| 5,953,322 A | 9/1999 | Kimball | |
| 5,956,518 A | 9/1999 | DeHon et al. | |
| 5,956,967 A | 9/1999 | Kim | |
| 5,959,811 A | 9/1999 | Richardson | |
| 5,959,881 A | 9/1999 | Trimberger et al. | |
| 5,963,048 A | 10/1999 | Harrison et al. | |
| 5,966,534 A | 10/1999 | Cooke et al. | |
| 5,970,254 A | 10/1999 | Cooke et al. | |
| 5,987,105 A | 11/1999 | Jenkins et al. | |
| 5,987,611 A | 11/1999 | Freund | |
| 5,991,302 A | 11/1999 | Berl et al. | |
| 5,991,308 A | 11/1999 | Fuhrmann et al. | |
| 5,993,739 A | 11/1999 | Lyon | |
| 5,999,734 A | 12/1999 | Willis et al. | |
| 6,005,943 A | 12/1999 | Cohen et al. | |
| 6,006,249 A | 12/1999 | Leong | |
| 6,016,395 A | 1/2000 | Mohamed | |
| 6,018,783 A | 1/2000 | Chiang | |
| 6,021,186 A | 2/2000 | Suzuki et al. | |
| 6,021,492 A | 2/2000 | May | |
| 6,023,742 A | 2/2000 | Ebeling et al. | |
| 6,023,755 A | 2/2000 | Casselman | |
| 6,028,610 A | 2/2000 | Deering | |
| 6,036,166 A | 3/2000 | Olson | |
| 6,039,219 A | 3/2000 | Bach et al. | |
| 6,041,322 A | 3/2000 | Meng et al. | |
| 6,041,970 A | 3/2000 | Vogel | |
| 6,046,603 A | 4/2000 | New | |
| 6,047,115 A | 4/2000 | Mohan et al. | |
| 6,052,600 A | 4/2000 | Fette et al. | |
| 6,055,314 A | 4/2000 | Spies et al. | |
| 6,056,194 A | 5/2000 | Kolls | |
| 6,059,840 A | 5/2000 | Click, Jr. | |
| 6,061,580 A | 5/2000 | Altschul et al. | |
| 6,073,132 A | 6/2000 | Gehman | |
| 6,076,174 A | 6/2000 | Freund | |
| 6,078,736 A | 6/2000 | Guccione | |
| 6,085,740 A | 7/2000 | Ivri et al. | |
| 6,088,043 A | 7/2000 | Kelleher et al. | |
| 6,091,263 A | 7/2000 | New et al. | |
| 6,091,765 A | 7/2000 | Pietzold, III et al. | |
| 6,094,065 A | 7/2000 | Tavana et al. | |
| 6,094,726 A | 7/2000 | Gonion et al. | |
| 6,111,893 A | 8/2000 | Volftsun et al. | |
| 6,111,935 A | 8/2000 | Hughes-Hartogs | |
| 6,112,218 A | 8/2000 | Gandhi et al. | |
| 6,115,751 A | 9/2000 | Tam et al. | |
| 6,119,178 A | 9/2000 | Martin et al. | |
| 6,120,551 A | 9/2000 | Law et al. | |
| 6,122,670 A | 9/2000 | Bennett et al. | |
| 6,128,307 A | 10/2000 | Brown | |
| 6,134,605 A | 10/2000 | Hudson et al. | |
| 6,134,629 A | 10/2000 | L'Ecuyer | |
| 6,138,693 A | 10/2000 | Matz | |
| 6,141,283 A | 10/2000 | Bogin et al. | |
| 6,150,838 A | 11/2000 | Wittig et al. | |
| 6,154,492 A | 11/2000 | Araki et al. | |
| 6,154,494 A | 11/2000 | Sugahara et al. | |

(56) References Cited

U.S. PATENT DOCUMENTS

| | | |
|---|---|---|
| 6,157,997 A | 12/2000 | Oowaki et al. |
| 6,173,389 B1 | 1/2001 | Pechanek et al. |
| 6,175,854 B1 | 1/2001 | Bretscher |
| 6,175,892 B1 | 1/2001 | Sazzad et al. |
| 6,181,981 B1 | 1/2001 | Varga et al. |
| 6,185,418 B1 | 2/2001 | MacLellan et al. |
| 6,192,070 B1 | 2/2001 | Poon et al. |
| 6,192,255 B1 | 2/2001 | Lewis et al. |
| 6,192,388 B1 | 2/2001 | Cajolet |
| 6,195,788 B1 | 2/2001 | Leaver et al. |
| 6,198,924 B1 | 3/2001 | Ishii et al. |
| 6,199,181 B1 | 3/2001 | Rechef et al. |
| 6,202,130 B1 | 3/2001 | Scales, III et al. |
| 6,202,189 B1 | 3/2001 | Hinedi et al. |
| 6,219,697 B1 | 4/2001 | Lawande et al. |
| 6,219,756 B1 | 4/2001 | Kasamizugami |
| 6,219,780 B1 | 4/2001 | Lipasti |
| 6,223,222 B1 | 4/2001 | Fijolek et al. |
| 6,226,387 B1 | 5/2001 | Tewfik et al. |
| 6,230,307 B1 | 5/2001 | Davis et al. |
| 6,237,029 B1 | 5/2001 | Master et al. |
| 6,246,883 B1 | 6/2001 | Lee |
| 6,247,125 B1 | 6/2001 | Noel-Baron et al. |
| 6,249,251 B1 | 6/2001 | Chang et al. |
| 6,258,725 B1 | 7/2001 | Lee et al. |
| 6,263,057 B1 | 7/2001 | Silverman |
| 6,266,760 B1 | 7/2001 | DeHon et al. |
| 6,272,579 B1 | 8/2001 | Lentz et al. |
| 6,272,616 B1 | 8/2001 | Fernando et al. |
| 6,279,020 B1 | 8/2001 | Dujardin et al. |
| 6,281,703 B1 | 8/2001 | Furuta et al. |
| 6,282,627 B1 | 8/2001 | Wong et al. |
| 6,289,375 B1 | 9/2001 | Knight et al. |
| 6,289,434 B1 | 9/2001 | Roy |
| 6,289,488 B1 | 9/2001 | Dave et al. |
| 6,292,822 B1 | 9/2001 | Hardwick |
| 6,292,827 B1 | 9/2001 | Raz |
| 6,292,830 B1 | 9/2001 | Taylor et al. |
| 6,301,653 B1 | 10/2001 | Mohamed et al. |
| 6,305,014 B1 | 10/2001 | Roediger et al. |
| 6,311,149 B1 | 10/2001 | Ryan et al. |
| 6,321,985 B1 | 11/2001 | Kolls |
| 6,326,806 B1 | 12/2001 | Fallside et al. |
| 6,346,824 B1 | 2/2002 | New |
| 6,347,346 B1 | 2/2002 | Taylor |
| 6,349,394 B1 | 2/2002 | Brock et al. |
| 6,353,841 B1 * | 3/2002 | Marshall et al. ............. 708/232 |
| 6,356,994 B1 | 3/2002 | Barry et al. |
| 6,359,248 B1 | 3/2002 | Mardi |
| 6,360,256 B1 | 3/2002 | Lim |
| 6,360,259 B1 | 3/2002 | Bradley |
| 6,360,263 B1 | 3/2002 | Kurtzberg et al. |
| 6,363,411 B1 | 3/2002 | Dugan et al. |
| 6,366,999 B1 | 4/2002 | Drabenstott et al. |
| 6,377,983 B1 | 4/2002 | Cohen et al. |
| 6,378,072 B1 | 4/2002 | Collins et al. |
| 6,381,293 B1 | 4/2002 | Lee et al. |
| 6,381,735 B1 | 4/2002 | Hunt |
| 6,385,751 B1 | 5/2002 | Wolf |
| 6,405,214 B1 | 6/2002 | Meade, II |
| 6,408,039 B1 | 6/2002 | Ito |
| 6,410,941 B1 | 6/2002 | Taylor et al. |
| 6,411,612 B1 | 6/2002 | Halford et al. |
| 6,421,372 B1 | 7/2002 | Bierly et al. |
| 6,421,809 B1 | 7/2002 | Wuytack et al. |
| 6,426,649 B1 | 7/2002 | Fu et al. |
| 6,430,624 B1 | 8/2002 | Jamtgaard et al. |
| 6,433,578 B1 | 8/2002 | Wasson |
| 6,434,590 B1 | 8/2002 | Blelloch et al. |
| 6,438,737 B1 | 8/2002 | Morelli et al. |
| 6,456,996 B1 | 9/2002 | Crawford, Jr. et al. |
| 6,459,883 B2 | 10/2002 | Subramanian et al. |
| 6,467,009 B1 | 10/2002 | Winegarden et al. |
| 6,469,540 B2 | 10/2002 | Nakaya |
| 6,473,609 B1 | 10/2002 | Schwartz et al. |
| 6,483,343 B1 | 11/2002 | Faith et al. |
| 6,507,947 B1 | 1/2003 | Schreiber et al. |
| 6,510,138 B1 | 1/2003 | Pannell |
| 6,510,510 B1 | 1/2003 | Garde |
| 6,538,470 B1 | 3/2003 | Langhammer et al. |
| 6,556,044 B2 | 4/2003 | Langhammer et al. |
| 6,563,891 B1 | 5/2003 | Eriksson et al. |
| 6,570,877 B1 | 5/2003 | Kloth et al. |
| 6,577,678 B2 | 6/2003 | Scheuermann |
| 6,587,684 B1 | 7/2003 | Hsu et al. |
| 6,590,415 B2 | 7/2003 | Agrawal et al. |
| 6,601,086 B1 | 7/2003 | Howard et al. |
| 6,601,158 B1 | 7/2003 | Abbott et al. |
| 6,604,085 B1 | 8/2003 | Kolls |
| 6,604,189 B1 | 8/2003 | Zemlyak et al. |
| 6,606,529 B1 | 8/2003 | Crowder, Jr. et al. |
| 6,611,906 B1 | 8/2003 | McAllister et al. |
| 6,615,333 B1 | 9/2003 | Hoogerbrugge et al. |
| 6,618,434 B2 | 9/2003 | Heidari-Bateni et al. |
| 6,618,777 B1 | 9/2003 | Greenfield |
| 6,640,304 B2 | 10/2003 | Ginter et al. |
| 6,647,429 B1 | 11/2003 | Semal |
| 6,653,859 B2 | 11/2003 | Sihlbom et al. |
| 6,675,265 B2 | 1/2004 | Barroso et al. |
| 6,675,284 B1 | 1/2004 | Warren |
| 6,684,319 B1 | 1/2004 | Mohamed et al. |
| 6,691,148 B1 | 2/2004 | Zinky et al. |
| 6,694,380 B1 | 2/2004 | Wolrich et al. |
| 6,711,617 B1 | 3/2004 | Bantz et al. |
| 6,718,182 B1 | 4/2004 | Kung |
| 6,721,286 B1 | 4/2004 | Williams et al. |
| 6,721,884 B1 | 4/2004 | De Oliveira Kastrup Pereira et al. |
| 6,732,354 B2 | 5/2004 | Ebeling et al. |
| 6,735,621 B1 | 5/2004 | Yoakum et al. |
| 6,738,744 B2 | 5/2004 | Kirovski et al. |
| 6,748,360 B2 | 6/2004 | Pitman et al. |
| 6,751,723 B1 | 6/2004 | Kundu et al. |
| 6,754,470 B2 | 6/2004 | Hendrickson et al. |
| 6,760,587 B2 | 7/2004 | Holtzman et al. |
| 6,760,833 B1 | 7/2004 | Dowling |
| 6,766,165 B2 | 7/2004 | Sharma et al. |
| 6,778,212 B1 | 8/2004 | Deng et al. |
| 6,785,341 B2 | 8/2004 | Walton et al. |
| 6,807,590 B1 | 10/2004 | Carlson et al. |
| 6,819,140 B2 | 11/2004 | Yamanaka et al. |
| 6,823,448 B2 | 11/2004 | Roth et al. |
| 6,829,633 B2 | 12/2004 | Gelfer et al. |
| 6,832,250 B1 | 12/2004 | Coons et al. |
| 6,836,839 B2 | 12/2004 | Master et al. |
| 6,854,002 B2 | 2/2005 | Conway et al. |
| 6,859,434 B2 | 2/2005 | Segal et al. |
| 6,865,664 B2 | 3/2005 | Budrovic et al. |
| 6,871,236 B2 | 3/2005 | Fishman et al. |
| 6,883,074 B2 | 4/2005 | Lee et al. |
| 6,883,084 B1 | 4/2005 | Donohoe |
| 6,894,996 B2 | 5/2005 | Lee |
| 6,901,440 B1 | 5/2005 | Bimm et al. |
| 6,907,598 B2 | 6/2005 | Fraser |
| 6,912,515 B2 | 6/2005 | Jackson et al. |
| 6,941,336 B1 | 9/2005 | Mar |
| 6,980,515 B1 | 12/2005 | Schunk et al. |
| 6,985,517 B2 | 1/2006 | Matsumoto et al. |
| 6,986,021 B2 | 1/2006 | Master et al. |
| 6,986,142 B1 | 1/2006 | Ehlig et al. |
| 6,988,139 B1 | 1/2006 | Jervis et al. |
| 7,032,229 B1 | 4/2006 | Flores et al. |
| 7,044,741 B2 | 5/2006 | Leem |
| 7,082,456 B2 | 7/2006 | Mani-Meitav et al. |
| 7,139,910 B1 | 11/2006 | Ainsworth et al. |
| 7,142,731 B1 | 11/2006 | Toi |
| 7,249,242 B2 | 7/2007 | Ramchandran |
| 2001/0003191 A1 | 6/2001 | Kovacs et al. |
| 2001/0023482 A1 | 9/2001 | Wray |
| 2001/0029515 A1 | 10/2001 | Mirsky |
| 2001/0034795 A1 | 10/2001 | Moulton et al. |
| 2001/0039654 A1 | 11/2001 | Miyamoto |
| 2001/0048713 A1 | 12/2001 | Medlock et al. |
| 2001/0048714 A1 | 12/2001 | Jha |
| 2001/0050948 A1 | 12/2001 | Ramberg et al. |

(56) References Cited

U.S. PATENT DOCUMENTS

| | | |
|---|---|---|
| 2002/0010848 A1 | 1/2002 | Kamano et al. |
| 2002/0013799 A1 | 1/2002 | Blaker |
| 2002/0013937 A1 | 1/2002 | Ostanevich et al. |
| 2002/0015435 A1 | 2/2002 | Rieken |
| 2002/0015439 A1 | 2/2002 | Kohli et al. |
| 2002/0023210 A1 | 2/2002 | Tuomenoksa et al. |
| 2002/0024942 A1 | 2/2002 | Tsuneki et al. |
| 2002/0024993 A1 | 2/2002 | Subramanian et al. |
| 2002/0031166 A1 | 3/2002 | Subramanian et al. |
| 2002/0032551 A1 | 3/2002 | Zakiya |
| 2002/0035623 A1 | 3/2002 | Lawande et al. |
| 2002/0041581 A1 | 4/2002 | Aramaki |
| 2002/0042907 A1 | 4/2002 | Yamanaka et al. |
| 2002/0061741 A1 | 5/2002 | Leung et al. |
| 2002/0069282 A1 | 6/2002 | Reisman |
| 2002/0072830 A1 | 6/2002 | Hunt |
| 2002/0078337 A1 | 6/2002 | Moreau et al. |
| 2002/0083305 A1 | 6/2002 | Renard et al. |
| 2002/0083423 A1 | 6/2002 | Ostanevich et al. |
| 2002/0087829 A1 | 7/2002 | Snyder et al. |
| 2002/0089348 A1 | 7/2002 | Langhammer |
| 2002/0101909 A1 | 8/2002 | Chen et al. |
| 2002/0107905 A1 | 8/2002 | Roe et al. |
| 2002/0107962 A1 | 8/2002 | Richter et al. |
| 2002/0119803 A1 | 8/2002 | Bitterlich et al. |
| 2002/0120672 A1 | 8/2002 | Butt et al. |
| 2002/0133688 A1 | 9/2002 | Lee et al. |
| 2002/0138716 A1 | 9/2002 | Master et al. |
| 2002/0141489 A1 | 10/2002 | Imaizumi |
| 2002/0147845 A1 | 10/2002 | Sanchez-Herrero et al. |
| 2002/0159503 A1 | 10/2002 | Ramachandran |
| 2002/0162026 A1 | 10/2002 | Neuman et al. |
| 2002/0167997 A1 | 11/2002 | Kim et al. |
| 2002/0168018 A1 | 11/2002 | Scheuermann |
| 2002/0181559 A1 | 12/2002 | Heidari-Bateni et al. |
| 2002/0184275 A1 | 12/2002 | Dutta et al. |
| 2002/0184291 A1 | 12/2002 | Hogenauer |
| 2002/0184498 A1 | 12/2002 | Qi |
| 2002/0191790 A1 | 12/2002 | Anand et al. |
| 2003/0007606 A1 | 1/2003 | Suder et al. |
| 2003/0012270 A1 | 1/2003 | Zhou et al. |
| 2003/0018446 A1 | 1/2003 | Makowski et al. |
| 2003/0018700 A1 | 1/2003 | Giroti et al. |
| 2003/0023649 A1 | 1/2003 | Kamiya et al. |
| 2003/0023830 A1 | 1/2003 | Hogenauer |
| 2003/0026242 A1 | 2/2003 | Jokinen et al. |
| 2003/0030004 A1 | 2/2003 | Dixon et al. |
| 2003/0046421 A1 | 3/2003 | Horvitz et al. |
| 2003/0061260 A1 | 3/2003 | Rajkumar |
| 2003/0061311 A1 | 3/2003 | Lo |
| 2003/0063656 A1 | 4/2003 | Rao et al. |
| 2003/0074473 A1 | 4/2003 | Pham et al. |
| 2003/0076815 A1 | 4/2003 | Miller et al. |
| 2003/0099223 A1 | 5/2003 | Chang et al. |
| 2003/0102889 A1 | 6/2003 | Master et al. |
| 2003/0105949 A1 | 6/2003 | Master et al. |
| 2003/0110485 A1 | 6/2003 | Lu et al. |
| 2003/0131162 A1 | 7/2003 | Secatch et al. |
| 2003/0142818 A1 | 7/2003 | Raghunathan et al. |
| 2003/0154357 A1 | 8/2003 | Master et al. |
| 2003/0163723 A1 | 8/2003 | Kozuch et al. |
| 2003/0172138 A1 | 9/2003 | McCormack et al. |
| 2003/0172139 A1 | 9/2003 | Srinivasan et al. |
| 2003/0200538 A1 | 10/2003 | Ebeling et al. |
| 2003/0212684 A1 | 11/2003 | Meyer et al. |
| 2003/0229864 A1 | 12/2003 | Watkins |
| 2004/0006584 A1 | 1/2004 | Vandeweerd |
| 2004/0010645 A1 | 1/2004 | Scheuermann et al. |
| 2004/0015970 A1 | 1/2004 | Scheuermann |
| 2004/0025159 A1 | 2/2004 | Scheuermann et al. |
| 2004/0057505 A1 | 3/2004 | Valio |
| 2004/0062300 A1 | 4/2004 | McDonough et al. |
| 2004/0081248 A1 | 4/2004 | Parolari |
| 2004/0086027 A1 | 5/2004 | Shattil |
| 2004/0093479 A1 | 5/2004 | Ramchandran |
| 2004/0133745 A1 | 7/2004 | Ramchandran |
| 2004/0168044 A1 | 8/2004 | Ramchandran |
| 2004/0174932 A1 | 9/2004 | Warke et al. |
| 2005/0044344 A1 | 2/2005 | Stevens |
| 2005/0166038 A1 | 7/2005 | Wang et al. |
| 2005/0166073 A1 | 7/2005 | Lee |
| 2005/0190871 A1 | 9/2005 | Sedarat |
| 2005/0198199 A1 | 9/2005 | Dowling |
| 2006/0031660 A1 | 2/2006 | Master et al. |

FOREIGN PATENT DOCUMENTS

| | | |
|---|---|---|
| EP | 0166586 | 1/1991 |
| EP | 0236633 | 5/1991 |
| EP | 0478624 | 4/1992 |
| EP | 0479102 | 4/1992 |
| EP | 0661831 | 7/1995 |
| EP | 0668659 | 8/1995 |
| EP | 0690588 | 1/1996 |
| EP | 0691754 | 1/1996 |
| EP | 0768602 | 4/1997 |
| EP | 0817003 | 1/1998 |
| EP | 0821495 | 1/1998 |
| EP | 0866210 | 9/1998 |
| EP | 0923247 | 6/1999 |
| EP | 0926596 | 6/1999 |
| EP | 1056217 | 11/2000 |
| EP | 1061437 | 12/2000 |
| EP | 1061443 | 12/2000 |
| EP | 1126368 | 8/2001 |
| EP | 1150506 | 10/2001 |
| EP | 1189358 | 3/2002 |
| GB | 2067800 | 7/1981 |
| GB | 2237908 | 5/1991 |
| JP | 62-249456 | 10/1987 |
| JP | 63-147258 | 6/1988 |
| JP | 4-51546 | 2/1992 |
| JP | 7-064789 | 3/1995 |
| JP | 7066718 | 3/1995 |
| JP | 10-233676 | 9/1998 |
| JP | 10-254696 | 9/1998 |
| JP | 11-296345 | 10/1999 |
| JP | 2000-315731 | 11/2000 |
| JP | 2001-053703 | 2/2001 |
| WO | WO 89/05029 | 6/1989 |
| WO | WO 89/11443 | 11/1989 |
| WO | WO 91/00238 | 1/1991 |
| WO | WO 93/13603 | 7/1993 |
| WO | WO 95/11855 | 5/1995 |
| WO | WO 96/33558 | 10/1996 |
| WO | WO 98/32071 | 7/1998 |
| WO | WO 99/03776 | 1/1999 |
| WO | WO 99/21094 | 4/1999 |
| WO | WO 99/26860 | 6/1999 |
| WO | WO 99/65818 | 12/1999 |
| WO | WO 00/19311 | 4/2000 |
| WO | WO 00/65855 | 11/2000 |
| WO | WO 00/69073 | 11/2000 |
| WO | WO 01/11281 | 2/2001 |
| WO | WO 01/22235 | 3/2001 |
| WO | WO 01/76129 | 10/2001 |
| WO | WO 02/12978 | 2/2002 |

OTHER PUBLICATIONS

Aggarwal et al., "Efficient Huffman Decoding," International Conference on Image Processing IEEE 1:936-939 (Sep. 10-13, 2000).

Allan et al., "Software Pipelining," ACM Computing Surveys, 27(3):1-78 (Sep. 1995).

Alsolaim et al., "Architecture and Application of a Dynamically Reconfigurable Hardware Array for Future Mobile Communication Systems," Field Programmable Custom Computing Machines, 2000 IEEE Symposium, Napa Valley, Los Alamitos, CA. IEEE Comput. Soc. pp. 205-214 (Apr. 17-19, 2000).

Altera Apex 20K dated Prior to Jan. 19, 2012.

Andraka Consulting Group, "Distributed Arithmetic," Obtained from: http://www.fpga-guru.com/distribu.htm dated Prior to Jan. 19, 2012.

(56) References Cited

OTHER PUBLICATIONS

Ashenden et al., "The VHDL Cookbook," Dept. Computer Science, University of Adelaide, South Australia. Downloaded from http://tams-www.informatik.uni-hamburg.de/vhdl/doc/cookbook/VHDL-Cookbook.pdf dated Prior to Jan. 19, 2012.
Bacon et al., "Compiler Transformations for High-Performance Computing," ACM Computing Surveys 26(4):368-373 (Dec. 1994).
Balasubramonian et al., "Reducing the Complexity of the Register File in Dynamic Superscalar Processors," Proceedings of the 34th Annual ACM/IEEE International Symposium on Microarchitecture, pp. 237-248 (Dec. 1, 2001).
Banerjee et al., "A MATLAB Compiler for Distributed, Heterogeneous, Reconfigurable Computing Systems," 2000 IEEE Symposium, pp. 39-48, (Apr. 17-19, 2000).
Bapty et al., "Uniform Execution Environment for Dynamic Reconfiguration," Darpa Adaptive Computing Systems, http://isis.vanderbilt.edu/publications/archive/babty_T_#_0_1999_Uniform_Ex.pdf, pp. 1-7 dated Prior to Jan. 19, 2012.
Baumgarte et al., "PACT XPP—A Self-Reconfigurable Data Processing Architecture," NN www.pactcorp.com/sneu/download/ersa01 dated Jun. 25, 2001.
Becker et al., "An Application-Tailored Dynamically Reconfigurable Hardware Architecture for Digital Baseband Processing," IEEE Conference Proceedings Article pp. 341-346 (Sep. 18, 2000).
Becker et al., "Design and Implementation of a Coarse-Grained Dynamically Reconfigurable Hardware Architecture," VLSI 2001, Proceedings IEEE Computer Soc. Workshop, Piscataway, NJ, USA, pp. 41-46 (Apr. 19-20, 2001).
Bevstar, BevStar Bottled Water Model Advertisement *Automatic Merchandiser* at www.AMonline.com dated Prior to Jan. 19, 2012.
Bevstar, BevStar Point of Use Water Model Advertisement *Automatic Merchandiser* at www.AMonline.com dated Prior to Jan. 19, 2012.
Bishop & Loucks, "A Heterogeneous Environment for Hardware/Software Cosimulation," Proceedings of the 30th Annual Simulation Symposium, pp. 14-22 (Apr. 7-9, 1997).
Brakensiek et al., "Re-Configurable Multi-Standard Terminal for Heterogeneous Networks," Radio and Wireless Conference, Rawcon 2002 IEEE. pp. 27-30 dated Prior to Jan. 19, 2012.
Brown et al., "Quick PDA Data Exchange," PC Magazine pp. 1-3 (May 22, 2001).
Buck et al., "Ptolemy: A Framework for Simulating and Prototyping Heterogeneous Systems," International Journal of Computer Simulation 4:155-182 (Apr. 1994).
Burns et al., "A Dynamic Reconfiguration Run-Time System," Proceedings of the 5th Annual Symposium on Field-Programmable Custom Computing Machines, pp. 1 66-75 (Apr. 16, 1997).
Business Wire, "Whirlpool Internet-Enabled Appliances to Use Beeline Shopper Software Features," http://www.whirlpoocorp.com/news/releases/release.asp?rid=90 dated Prior to Jan. 19, 2012.
Buttazzo et al., "Optimal Deadline Assignment for Scheduling Soft Aperiodic Tasks in Hard Real-Time Environments," Engineering of Complex Computer Systems, Proceedings of the Third IEEE International Conference on Como, pp. 39-48 (Sep. 8, 1997).
Callahan et al., "Adapting Software Pipelining for Reconfigurable Computing," in Proceedings of the International Conference on Compilers, Architecture and Synthesis for Embedded Systems p. 8, ACM (CASES '00, San Jose, CA) (Nov. 17-18, 2000).
Chapman & Mehrotra, "OpenMP and HPF: Integrating Two Paradigms," Proceedings of the 4th International Euro-Par Conference (Euro-Par'98), Springer-Verlag Heidelberg, Lecture Notes in Computer Science 1470:650-658 dated Prior to Jan. 19, 2012.
Chen et al., "A Reconfigurable Multiprocessor IC for Rapid Prototyping of Algorithmic-Specific High-Speed DSP Data Paths," IEEE Journal of Solid-State Circuits, IEEE 35:74-75 (Feb. 1, 2001).
Clarke, "Embedded Solutions Enters Development Pact with Marconi," EETimes Online (Jan. 26, 2000).
Compton & Hauck, "Reconfigurable Computing: A Survey of Systems and Software," ACM Press, ACM Computing Surveys (CSUR) 34(2):171-210 (Jun. 2002).

Compton et al., "Configuration Relocation and Defragmentation for Run-Time Reconfigurable Computing," Northwestern University, http://citeseer.nj.nec.com/compton00configuration.html, pp. 1-17 dated Prior to Jan. 19, 2012.
Conte et al., "Dynamic Rescheduling: A Technique for Object Code Compatibility in VLIW Architectures," Proceedings of the 28th Annual International Symposium on Microarchitecture pp. 208-218 (Nov. 29, 1995).
Conte et al., "Instruction Fetch Mechanisms for VLIW Architectures with Compressed Encodings," Proceedings of the Annual IEEE/ACM International Symposium on Microarchitecture (MICRO) 29:201-211 (Dec. 2, 1996).
Cray Research Inc., "Cray T3E Fortran Optimization Guide," Ver. 004-2518-002, Section 4.5 dated Prior to Jan. 19, 2012.
Cummings et al., "FPGA in the Software Radio," IEEE Communications Magazine . 37(2):108-112 (Feb. 1999).
Dandalis et al., "An Adaptive Cryptographic Engine for IPSec Architectures," IEEE pp. 132-141 (Jan. 2000).
David et al., "DART: A Dynamically Reconfigurable Architecture Dealing with Future Mobile Telecommunication Constraints," Proceedings of the International Parallel and Distributed Processing Symposium pp. 156-163 (Apr. 15, 2002).
Deepakumara et al., "FPGA Implementation of MD5 has Algorithm," Canadian Conference on Electrical and Computer Engineering, IEEE dated Prior to Jan. 19, 2012.
Dehon et al., "Reconfigurable Computing: What, Why and Implications for Design Automation," Design Automation Conference Proceedings pp. 610-615 dated Prior to Jan. 19, 2012.
Dipert, "Figuring Out Reconfigurable Logic," EDN 44(16):107-114 (Aug. 5, 1999).
Dominikus, "A Hardware Implementation of MD4-Family Hash Algorithms," 9th International Conference on Electronics, Circuits and Systems IEEE dated Prior to Jan. 19, 2012.
Dorband, "aCe C Language Reference Guide," Online (Archived Mar. 2001), http://web.archive.org/web/20000616053819/http://newton.gsfc.nasa.gov/aCe/aCe_dir/aCe_cc_Ref.html dated Prior to Jan. 19, 2012.
Drozdowski, "Scheduling Multiprocessor Tasks—An Overview," Instytut Informatyki Politechnika, pp. 1-31 (Jan. 31, 1996).
Ebeling et al., "RaPiD Reconfigurable Pipelined Datapath," Springer-Verlag, 6th International Workshop on Field-Programmable Logic and Applications pp. 126-135 dated Prior to Jan. 19, 2012.
Fawer et al., "A Multiprocessor Approach for Implementing a Time-Diversity Spread Spectrum Receiver," Proceedings of the 1990 International Zurich Seminal on Digital Communications, pp. 173-180 (Mar. 5-8, 1990).
Fisher, "Gone Flat," Forbes pp. 76-79 (Oct. 2001).
Fleischmann et al., "Prototyping Networked Embedded Systems," Integrated Engineering, pp. 116-119 (Feb. 1999).
Forbes "Best of the Web—Computer Networking/Consumer Durables," *The Forbes Magnetic 40* p. 80 (May 2001).
Gibson, "Fresh Technologies Will Create Myriad Functions," FT Information Technology Review; World Wide Web at http://technews.acm.org/articles/2000-2/0301w.html?searchterm=%22fresh+technologies%22 (Mar. 1, 2000).
Gluth, "Integrierte Signalprozessoren," Elektronik 35(18):112-118 Franzis Verlag GMBH, Munich, Germany (Sep. 5, 1986).
Gokhale & Schlesinger, "A Data Parallel C and Its Platforms," Proceedings of the Fifth Symposium on the Frontiers of Massively Parallel Computation pp. 194-202 (Frontiers'95) (Feb. 1995).
Grimm et al., "A System Architecture for Pervasive Computing," Washington University, pp. 1-6 (Sep. 2000).
Halbwachs et al., "The Synchronous Data Flow Programming Language LUSTRE," Proceedings of the IEEE 79(9):1305-1319 (Sep. 1991).
Hammes et al., "Cameron: High Level Language Compilation for Reconfigurable Systems," Proc. of the Intl. Conf. on Parallel Architectures and Compilation Techniques, pp. 236-244 (Oct. 1999).
Hanna et al., "A Normalized Backpropagation Learning Algorithm for Multilayer Feed-Forward Neural Adaptive Filters," *Neural Networks for Signal Processing XI*, Proceedings of the 2001 IEEE Signal Processing Society Workshop pp. 63-72 (Sept 2001).

(56) References Cited

OTHER PUBLICATIONS

Hartenstein, "Coarse Grain Reconfigurable Architectures," Design Automation Conference, 2001. Proceedings of the ASP-Dac 2001, Asian and South Pacific Jan. 30, 2001—Feb. 2, 2001, Piscataway, NJ, US, IEEE, pp. 564-569 (Jan. 30, 2001).
Heinz, "An Efficiently Compliable Extension of {M}odula-3 for Problem-Oriented Explicitly Parallel Programming," Proceedings of the Joint Symposium on Parallel Processing (May 1993).
Hinden et al., "The DARPA Internet: Interconnecting Heterogeneous Computer Networks with Gateways," IEEE Computer Magazine pp. 38-48 dated Prior to Jan. 19, 2012.
Horton, "Beginning Java 2: JDK 1.3 Edition," Wrox Press, Chapter 8, pp. 313-316 (Feb. 2001).
Huff et al., "Lifetime-Sensitive Modulo Scheduling," 6th Conference on Programming Language, Design and Implementation, pp. 258-267, ACM dated Prior to Jan. 19, 2012.
IBM, "Multisequencing a Single Instruction Stream Scheduling with Space-time Trade-offs," IBM Technical Disclosure Bulletin 36(2):105-108 (Feb. 1, 1993).
IEEE, "IEEE Standard Verilog Hardware Description Language," downloaded from http://inst.eecs.berkeley.edu/~cs150/fa06/Labs/verilog-ieee.pdf on Dec. 7, 2006 (Sep. 2001).
Internet Wire, Sunbeam Joins Microsoft in University Plug and Play Forum to Establish A "Universal" Smart Appliance Technology Standard (Mar. 23, 2000).
Ishii et al., "Parallel Variable Length Decoding with Inverse Quantization for Software MPEG-2 Decoders," Workshop on Signal Processing Systems, Design and Implementation, IEEE pp. 500-509 (Nov. 3-5, 1997).
Jain et al., "An Alternative Approach Towards the Design of Control Units," Microelectronics and Reliability 24(6):1009-1012 dated Prior to Jan. 19, 2012.
Jain, "Parallel Processing with the TMS320C40 Parallel Digital Signal Processor," Sonitech International Inc., pp. 13-46. Retrieved from: http://www-s.ti.com/sc/psheets/spra031/spra031.pdf retrieved on Apr. 14, 2004 (Feb. 1994).
Janssen et al., "Partitioned Register File for TTAs," Proceedings of the 28th Annual International Symposium on Microarchitecture, pp. 303-312 (Nov. 1995).
Janweijer et al., "A Compact Robin Using the SHarc (CRUSH)," Obtained from://www.nikhef.nl/~peterj/Crush/CRUSH-hw.pdf (Sep. 1998).
Jong-Pyng et al., "Real-Time Virtual Channel Flow Control," Proceedings of the Annual International Phoenix Conference on Computers and Communications, Conf. 13, pp. 97-103 (Apr. 12, 1994).
Jung et al., "Efficient Hardware Controller Synthesis for Synchronous Dataflow Graph in System Level Design," Proceedings of the 13th International Symposium on System Synthesis pp. 79-84 (ISSS'00) (Sep. 2000).
Kaufmann et al., "Digital Spread-Spectrum Multipath-Diversity Receiver for Indoor Communication," from Pioneers to the 21st Century; Denver, Proceedings of the Vehicular Technology Socity [sic] Conference, NY, IEEE, US 2(Conf. 42):1038-1041 (May 10-13, 1992).
Kneip et al., "An Algorithm Adapted Autonomous Controlling Concept for a Parallel Single-Chip Digital Signal Processor," Journal of VLSI Signal Processing Systems for Signal, Image, and Video Technology 16(1):31-40 (May 1, 1997).
Lee & Messerschmitt, "Pipeline Interleaved Programmable DSP's: Synchronous Data Flow Programming," IEEE Transactions on Acoustics, Speech, and Signal Processing ASSP-35(9):1334-1345 (Sep. 1987).
Lee & Messerschmitt, "Synchronous Data Flow," Proceedings of the IEEE 75(9):1235-1245 (Sep. 1987).
Lee & Parks, "Dataflow Process Networks," Proceedings of the IEEE 83(5):773-799 (May 1995).
Liu et al., "Scheduling Algorithms for Multiprogramming in a Hard-Real-Time Environment," *Journal of the Association for Computing* 20(1):46-61 dated Prior to Jan. 19, 2012.
Llosa et al., "Lifetime-Sensitive Modulo Scheduling in a Production Environment," IEEE Trans. on Comps. 50(3):234-249 (Mar. 2001).
Lu et al., "The Morphosys Dynamically Reconfigurable System-On-Chip," Proceedings of the First NASA/DOD Workshop on Evolvable Hardware, pp. 152-160 (Jul. 19, 1999).
Mangione-Smith et al., "Seeking Solutions in Configurable Computing," *Computer* 30(12):38-43 (Dec. 1997).
Manion, "Network CPU Adds Spice," Electronic Engineering Times, Issue 1126 (Aug. 14, 2000).
Mascia & Ishii., "Neural Net Implementation on Single-Chip Digital Signal Processor," IEEE dated Prior to Jan. 19, 2012.
McGraw, "Parallel Functional Programming in Sisal: Fictions, Facts, and Future," Lawrence Livermore National Laboratory pp. 1-40 (Jul. 1993).
Najjar et al., "High-Level Language Abstraction for Reconfigurable Computing," *Computer* 36(8):63-69 (Aug. 2003).
Nichols et al., "Data Management and Control-Flow Constructs in a SIMD/SPMD Parallel Language/Compiler," Proceedings of the 3rd Symposium on the Frontiers of Massively Parallel Computation pp. 397-406 (Oct. 1990).
OpenMP Architecture Review Board, "OpenMP C and C++ Application Program Interface," pp. 7-16 (Oct. 1998).
Oracle Corporation, "Oracle8i JDBC Developer's Guide and Reference," Release 3, 8.1.7, pp. 10-8-10-10 (Jul. 2000).
Pauer et al., "Algorithm Analysis and Mapping Environment for Adaptive Computing Systems: Further Results," Proc. IEEE Symposium on FPGA's for Custom Computing Machines (FCCM), Napa CA dated Prior to Jan. 19, 2012.
Pauer et al., "Algorithm Analysis and Mapping Environment for Adaptive Computing Systems," Presentation slides, Third Bi-annual Ptolemy Miniconference dated Prior to Jan. 19, 2012.
Rajagopalan et al., "A Flexible Multiplication Unit for an FPGA Logic Block," *Circuits and Systems* 4:546-9 dated Prior to Jan. 19, 2012.
Ramamritham et al., "On Scheduling Algorithms for Real-Time Multiprocessor Systems," Algorithms and Applications, Proceedings of the International conference on Parallel Processing 3:143-152 (Aug. 8, 1989).
Schneider, "A Parallel/Serial Trade-Off Methodology for Look-Up Table Based Decoders," Proceedings of the Design Automation Conference 34:498-503 (Jun. 9-13, 1997).
Sidhu et al., "A Self-Reconfigurable Gate Array Architecture," 10 International Workshop on Field Programmable Logic and Applications http://coblitz.codeen.org:3125/citeseer.ist.psu.edu/cache/papers/cs/17524/http:zSzzSzmaarcii. usc.eduzSzPublicationsZSzsidhu__fp100.pdf/sidhu00selfreconfigurable.pdf retrieved on Jun. 21, 2006 (Sep. 1, 2001).
Smith, "Intro to ASICs: ASIC Cell Libraries," at http://iroi.seu.edu.cn/books/asics/Book2/CH01/CH01.5.htm, printed on Feb. 4, 2005 (Jun. 1997).
Souza, "Computing's New Face—Reconfigurable Devices Could Rattle Supply Chain," Electronic Buyers' News Issue 1205, pg. P.1 (Apr. 3, 2000).
Souza, "Quicksilver Buys White Eagle," Electronic Buyers News, Issue 1220 (Jul. 17, 2000).
Sriram et al., "MPEG-2 Video Decoding on the TMS320C6X DSP Architecture," Conference Record of the 32nd Asilomar Conference on Signals, Systems, and Computers, IEEE pp. 1735-1739 (Nov. 1-4, 1998).
Steiner, "Coke Chiefs Latest Daft Idea—A Cola Tap in Every House," Sunday Times (Mar. 2001).
Sun Microsystems, "FORTRAN 3.0.1 User's Guide, Revision A," pp. 57-68 (Aug. 1994).
Svensson, "Co's Join on Home Web Wiring Network," Associated Press Online printed on Apr. 30, 2008 (Jun. 2000).
Tang et al., "Thread Partitioning and Scheduling Based on Cost Model," Proceedings of the Ninth Annual ACM Symposium on Parallel Algorithms and Architectures, pp. 272-281 Retrieved from: http://doi.acm.org/10.1145/258492.2585 dated Prior to Jan. 19, 2012.

(56) References Cited

OTHER PUBLICATIONS

Vaya, "VITURBO: A Reconfigurable Architecture for Ubiquitous Wireless Networks," A Thesis Submitted in Partial Fulfillment of the Requirements for the Degree Master of Science; RICE University (Aug. 2002).

Wang et al., "Cell Search in W-CDMA," IEEE Journal on Selected Areas in Communications 18(8):1470-1482 (Aug. 2000).

Wardell, "Help for Hurried Cooks?," Popular Science, p. 32 (May 2000).

Whiting & Pascoe, "A History of Data-Flow Languages," IEEE Annals of the History of Computing 16(4):38-59 dated Prior to Jan. 19, 2012.

Williamson & Lee, "Synthesis of Parallel Hardware Implementations from Synchronous Dataflow Graph Specifications," Conference Record of the Thirtieth Asilomar Conference on Signals, Systems and Computers 1340-1343 (Nov. 1996).

Wirthlin et al., "A Dynamic Instruction Set Computer," Proceedings of the IEEE Symposium on FPGA's for Custom Computing Machines, pp. 99-107 (Apr. 21, 1995).

www.gatewayay.com, World Wide Web, http://web.archive.org/web/20000229192734/www.gateway.com/productpages/9300splash/index.shtml Available on Mar. 3, 2000, p. 1 (Mar. 3, 2000).

www.margherita2000.com; from Margherita2000.com printed Apr. 30, 2008 (Jan. 26, 2001).

Xilinx Data Book dated Prior to Jan. 19, 2012.

Xilinx Virtex 1.1 dated Prior to Jan. 19, 2012.

Xilinx Virtex 2.2 dated Prior to Jan. 19, 2012.

Xilinx, "Virtex-II Pro Platform FPGAs: Functional Description DS083-2 (v2.5)," Product Specification, pp. 13-46 (Jan. 20, 2003).

Young, "Architecture Powers up IPSec, SSL," EETimes, Los Gatos, CA, pp. 1-4 http://www.eetimes.com/story/OEG20011102S0065 (Nov. 2, 2001).

Yuan et al., "A Decomposition Approach to Non-Preemptive Real-Time Scheduling," Real Time Systems 6(1):7-35 dated Prior to Jan. 19, 2012.

Zaino et al., "Algorithm Analysis and Mapping Environment for Adaptive Computing Systems," Final Technical Report, DARPA Contract F33615-97-C-1174 (Sep. 2001).

Zhang et al., "A 1V Heterogeneous Reconfigurable Processor IC for Baseband Wireless Applications," 2000 IEEE Solid dated Prior to Jan. 19, 2012.

\* cited by examiner

ADAPTIVE COMPUTING ENGINE (ACE)

ADAPTIVE INTEGRATED CIRCUITRY WITH HETEROGENEOUS AND RECONFIGURABLE MATRICES OF DIVERSE AND ADAPTIVE COMPUTATIONAL UNITS HAVING FIXED, APPLICATION SPECIFIC COMPUTATIONAL ELEMENTS

FIELD OF THE INVENTION

The present invention relates, in general, to integrated circuits and, more particularly, to adaptive integrated circuitry with heterogeneous and reconfigurable matrices of diverse and adaptive computational units having fixed, application specific computational elements.

BACKGROUND OF THE INVENTION

The advances made in the design and development of integrated circuits ("ICs") have generally produced ICs of several different types or categories having different properties and functions, such as the class of universal Turing machines (including microprocessors and digital signal processors ("DSPs")), application specific integrated circuits ("ASICs") and field programmable gate arrays ("FPGAs"). Each of these different types of ICs, and their corresponding design methodologies, have distinct advantages and disadvantages.

Microprocessors and DSPs, for example, typically provide a flexible, software programmable solution for the implementation of a wide variety of tasks. As various technology standards evolve, microprocessors and DSPs may be reprogrammed, to varying degrees, to perform various new or altered functions or operations. Various tasks or algorithms, however, must be partitioned and constrained to fit the physical limitations of the processor, such as bus widths and hardware availability. In addition, as processors are designed for the execution of instructions, large areas of the IC are allocated to instruction processing, with the result that the processors are comparatively inefficient in the performance of actual algorithmic operations, with only a few percent of these operations performed during any given clock cycle. Microprocessors and DSPs, moreover, have a comparatively limited activity factor, such as having only approximately five percent of their transistors engaged in algorithmic operations at any given time, with most of the transistors allocated to instruction processing. As a consequence, for the performance of any given algorithmic operation, processors consume significantly more IC (or silicon) area and consume significantly more power compared to other types of ICs, such as ASICs.

While having comparative advantages in power consumption and size, ASICs provide a fixed, rigid or "hard-wired" implementation of transistors (or logic gates) for the performance of a highly specific task or a group of highly specific tasks. ASICs typically perform these tasks quite effectively, with a comparatively high activity factor, such as with twenty-five to thirty percent of the transistors engaged in switching at any given time. Once etched, however, an ASIC is not readily changeable, with any modification being time-consuming and expensive, effectively requiring new masks and new fabrication. As a further result, ASIC design virtually always has a degree of obsolescence, with a design cycle lagging behind the evolving standards for product implementations. For example, an ASIC designed to implement GSM (Global System for Mobile Communications) or CDMA (code division multiple access) standards for mobile communication becomes relatively obsolete with the advent of a new standard, such as 3G.

FPGAs have evolved to provide some design and programming flexibility, allowing a degree of post-fabrication modification. FPGAs typically consist of small, identical sections or "islands" of programmable logic (logic gates) surrounded by many levels of programmable interconnect, and may include memory elements. FPGAs are homogeneous, with the IC comprised of repeating arrays of identical groups of logic gates, memory and programmable interconnect. A particular function may be implemented by configuring (or reconfiguring) the interconnect to connect the various logic gates in particular sequences and arrangements. The most significant advantage of FPGAs are their post-fabrication reconfigurability, allowing a degree of flexibility in the implementation of changing or evolving specifications or standards. The reconfiguring process for an FPGA is comparatively slow, however, and is typically unsuitable for most real-time, immediate applications.

While this post-fabrication flexibility of FPGAs provides a significant advantage, FPGAs have corresponding and inherent disadvantages. Compared to ASICs, FPGAs are very expensive and very inefficient for implementation of particular functions, and are often subject to a "combinatorial explosion" problem. More particularly, for FPGA implementation, an algorithmic operation comparatively may require orders of magnitude more IC area, time and power, particularly when the particular algorithmic operation is a poor fit to the pre-existing, homogeneous islands of logic gates of the FPGA material. In addition, the programmable interconnect, which should be sufficiently rich and available to provide reconfiguration flexibility, has a correspondingly high capacitance, resulting in comparatively slow operation and high power consumption. For example, compared to an ASIC, an FPGA implementation of a relatively simple function, such as a multiplier, consumes significant IC area and vast amounts of power, while providing significantly poorer performance by several orders of magnitude. In addition, there is a chaotic element to FPGA routing, rendering FPGAs subject to unpredictable routing delays and wasted logic resources, typically with approximately one-half or more of the theoretically available gates remaining unusable due to limitations in routing resources and routing algorithms.

Various prior art attempts to meld or combine these various processor, ASIC and FPGA architectures have had utility for certain limited applications, but have not proven to be successful or useful for low power, high efficiency, and real-time applications. Typically, these prior art attempts have simply provided, on a single chip, an area of known FPGA material (consisting of a repeating array of identical logic gates with interconnect) adjacent to either a processor or an ASIC, with limited interoperability, as an aid to either processor or ASIC functionality. For example, Trimberger U.S. Pat. No. 5,737, 631, entitled "Reprogrammable Instruction Set Accelerator", issued Apr. 7, 1998, is designed to provide instruction acceleration for a general purpose processor, and merely discloses a host CPU (central processing unit) made up of such a basic microprocessor combined in parallel with known FPGA material (with an FPGA configuration store, which together form the reprogrammable instruction set accelerator). This reprogrammable instruction set accelerator, while allowing for some post-fabrication reconfiguration flexibility and processor acceleration, is nonetheless subject to the various disadvantages of traditional processors and traditional FPGA material, such as high power consumption and high capacitance, with comparatively low speed, low efficiency and low activity factors.

Tavana et al. U.S. Pat. No. 6,094,065, entitled "Integrated Circuit with Field Programmable and Application Specific Logic Areas", issued Jul. 25, 2000, is designed to allow a degree of post-fabrication modification of an ASIC, such as for correction of design or other layout flaws, and discloses use of a field programmable gate array in a parallel combination with a mask-defined application specific logic area (i.e., ASIC material). Once again, known FPGA material, consisting of a repeating array of identical logic gates within a rich programmable interconnect, is merely placed adjacent to ASIC material within the same silicon chip. While potentially providing post-fabrication means for "bug fixes" and other error correction, the prior art IC is nonetheless subject to the various disadvantages of traditional ASICs and traditional FPGA material, such as highly limited reprogrammability of an ASIC, combined with high power consumption, comparatively low speed, low efficiency and low activity factors of FPGAs.

As a consequence, a need remains for a new form or type of integrated circuitry which effectively and efficiently combines and maximizes the various advantages of processors, ASICs and FPGAs, while minimizing potential disadvantages. Such a new form or type of integrated circuit should include, for instance, the programming flexibility of a processor, the post-fabrication flexibility of FPGAs, and the high speed and high utilization factors of an ASIC. Such integrated circuitry should be readily reconfigurable, in real-time, and be capable of having corresponding, multiple modes of operation. In addition, such integrated circuitry should minimize power consumption and should be suitable for low power applications, such as for use in handheld and other battery-powered devices.

SUMMARY OF THE INVENTION

The present invention provides new form or type of integrated circuitry which effectively and efficiently combines and maximizes the various advantages of processors, ASICs and FPGAs, while minimizing potential disadvantages. In accordance with the present invention, such a new form or type of integrated circuit, referred to as an adaptive computing engine (ACE), is disclosed which provides the programming flexibility of a processor, the post-fabrication flexibility of FPGAs, and the high speed and high utilization factors of an ASIC. The ACE integrated circuitry of the present invention is readily reconfigurable, in real-time, is capable of having corresponding, multiple modes of operation, and further minimizes power consumption while increasing performance, with particular suitability for low power applications, such as for use in hand-held and other battery-powered devices.

The ACE architecture of the present invention, for adaptive or reconfigurable computing, includes a plurality of heterogeneous computational elements coupled to an interconnection network, rather than the homogeneous units of FPGAs. The plurality of heterogeneous computational elements include corresponding computational elements having fixed and differing architectures, such as fixed architectures for different functions such as memory, addition, multiplication, complex multiplication, subtraction, configuration, reconfiguration, control, input, output, and field programmability. In response to configuration information, the interconnection network is operative in real-time to configure and reconfigure the plurality of heterogeneous computational elements for a plurality of different functional modes, including linear algorithmic operations, non-linear algorithmic operations, finite state machine operations, memory operations, and bit-level manipulations.

As illustrated and discussed in greater detail below, the ACE architecture of the present invention provides a single IC, which may be configured and reconfigured in real-time, using these fixed and application specific computation elements, to perform a wide variety of tasks. For example, utilizing differing configurations over time of the same set of heterogeneous computational elements, the ACE architecture may implement functions such as finite impulse response filtering, fast Fourier transformation, discrete cosine transformation, and with other types of computational elements, may implement many other high level processing functions for advanced communications and computing.

Numerous other advantages and features of the present invention will become readily apparent from the following detailed description of the invention and the embodiments thereof, from the claims and from the accompanying drawings.

DETAILED DESCRIPTION

Figure 1:
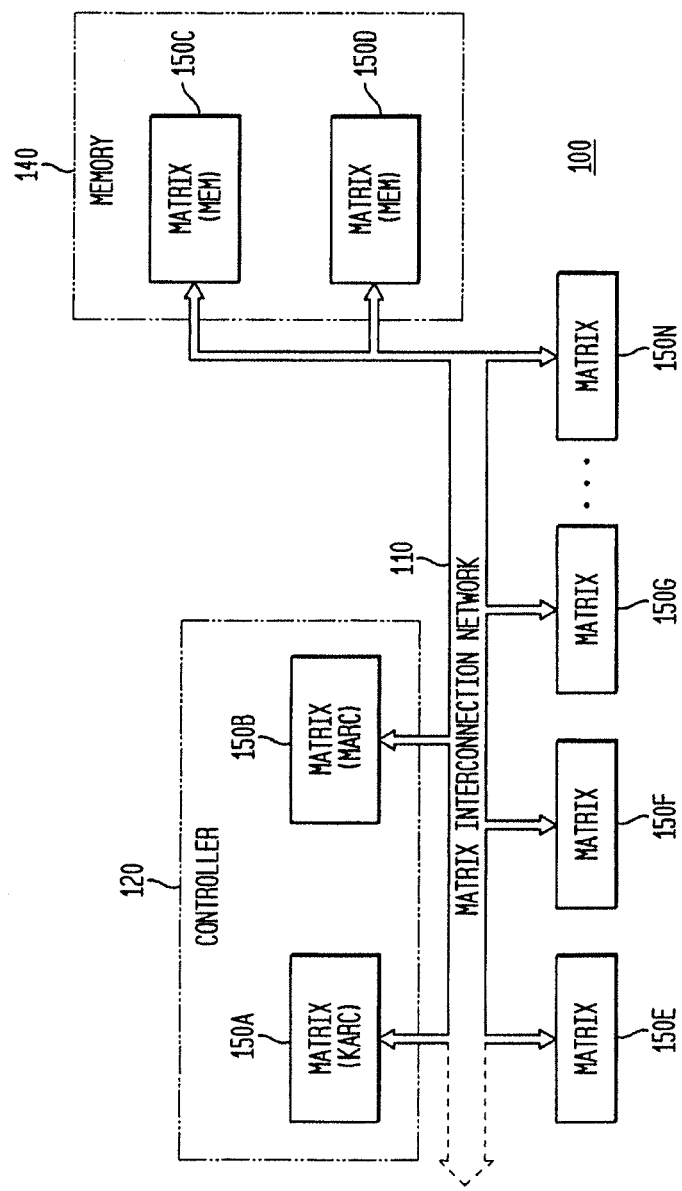
FIG. 1 is a block diagram illustrating a preferred apparatus embodiment in accordance with the present invention.

While the present invention is susceptible of embodiment in many different forms, there are shown in the drawings and will be described herein in detail specific embodiments thereof, with the understanding that the present disclosure is to be considered as an exemplification of the principles of the invention and is not intended to limit the invention to the specific embodiments illustrated.

As indicated above, a need remains for a new form or type of integrated circuitry which effectively and efficiently combines and maximizes the various advantages of processors, ASICs and FPGAs, while minimizing potential disadvantages. In accordance with the present invention, such a new form or type of integrated circuit, referred to as an adaptive computing engine (ACE), is disclosed which provides the programming flexibility of a processor, the post-fabrication flexibility of FPGAs, and the high speed and high utilization factors of an ASIC. The ACE integrated circuitry of the present invention is readily reconfigurable, in real-time, is capable of having corresponding, multiple modes of operation, and further minimizes power consumption while increasing performance, with particular suitability for low power applications.

FIG. 1 is a block diagram illustrating a preferred apparatus 100 embodiment in accordance with the present invention. The apparatus 100, referred to herein as an adaptive computing engine ("ACE") 100, is preferably embodied as an integrated circuit, or as a portion of an integrated circuit having other, additional components. In the preferred embodiment, and as discussed in greater detail below, the ACE 100 includes one or more reconfigurable matrices (or nodes) 150, such as matrices 150A through 150N as illustrated, and a matrix interconnection network 110. Also in the preferred embodiment, and as discussed in detail below, one or more of the matrices 150, such as matrices 150A and 150B, are configured for functionality as a controller 120, while other matrices, such as matrices 150C and 150D, are configured for functionality as a memory 140. The various matrices 150 and matrix interconnection network 110 may also be implemented together as fractal subunits, which may be scaled from a few nodes to thousands of nodes.

A significant departure from the prior art, the ACE 100 does not utilize traditional (and typically separate) data, DMA, random access, configuration and instruction busses for signaling and other transmission between and among the reconfigurable matrices 150, the controller 120, and the memory 140, or for other input/output ("I/O") functionality. Rather, data, control and configuration information are transmitted between and among these matrix 150 elements, utilizing the matrix interconnection network 110, which may be configured and reconfigured, in real-time, to provide any given connection between and among the reconfigurable matrices 150, including those matrices 150 configured as the controller 120 and the memory 140, as discussed in greater detail below.

The matrices 150 configured to function as memory 140 may be implemented in any desired or preferred way, utilizing computational elements (discussed below) of fixed memory elements, and may be included within the ACE 100 or incorporated within another IC or portion of an IC. In the preferred embodiment, the memory 140 is included within the ACE 100, and preferably is comprised of computational elements which are low power consumption random access memory (RAM), but also may be comprised of computational elements of any other form of memory, such as flash, DRAM (dynamic random access memory), SRAM (static random access memory), MRAM (magnetoresistive random access memory), ROM (read only memory), EPROM (erasable programmable read only memory) or $E^2PROM$ (electrically erasable programmable read only memory). In the preferred embodiment, the memory 140 preferably includes direct memory access (DMA) engines, not separately illustrated.

The controller 120 is preferably implemented, using matrices 150A and 150B configured as adaptive finite state machines, as a reduced instruction set ("RISC") processor, controller or other device or IC capable of performing the two types of functionality discussed below. (Alternatively, these functions may be implemented utilizing a conventional RISC or other processor.) The first control functionality, referred to as "kernal" control, is illustrated as kernal controller ("KARC") of matrix 150A, and the second control functionality, referred to as "matrix" control, is illustrated as matrix controller ("MARC") of matrix 150B. The kernal and matrix control functions of the controller 120 are explained in greater detail below, with reference to the configurability and reconfigurability of the various matrices 150, and with reference to the preferred form of combined data, configuration and control information referred to herein as a "silverware" module.

Figure 3:
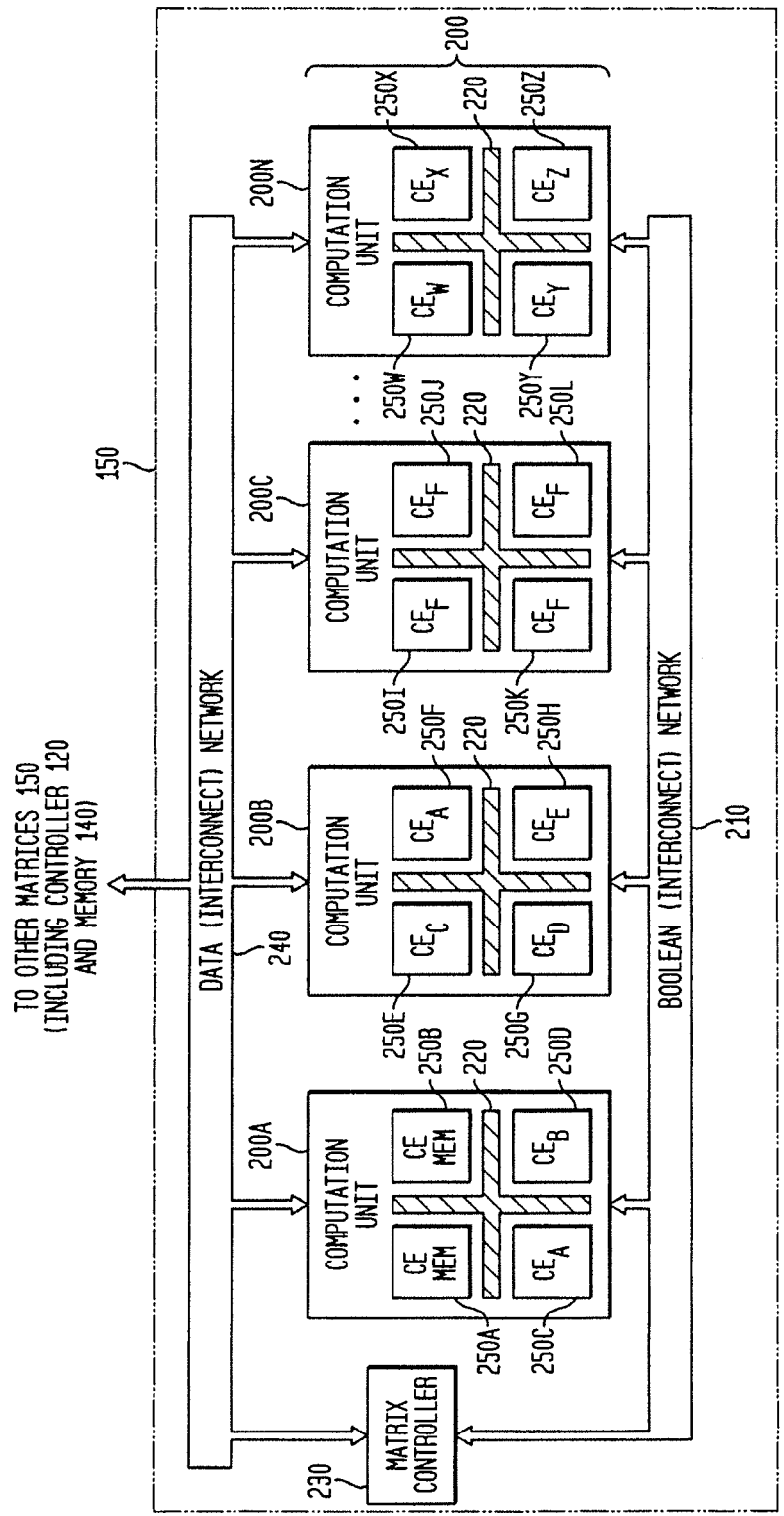
FIG. 3 is a block diagram illustrating a reconfigurable matrix, a plurality of computation units, and a plurality of computational elements, in accordance with the present invention.
Figure 4:
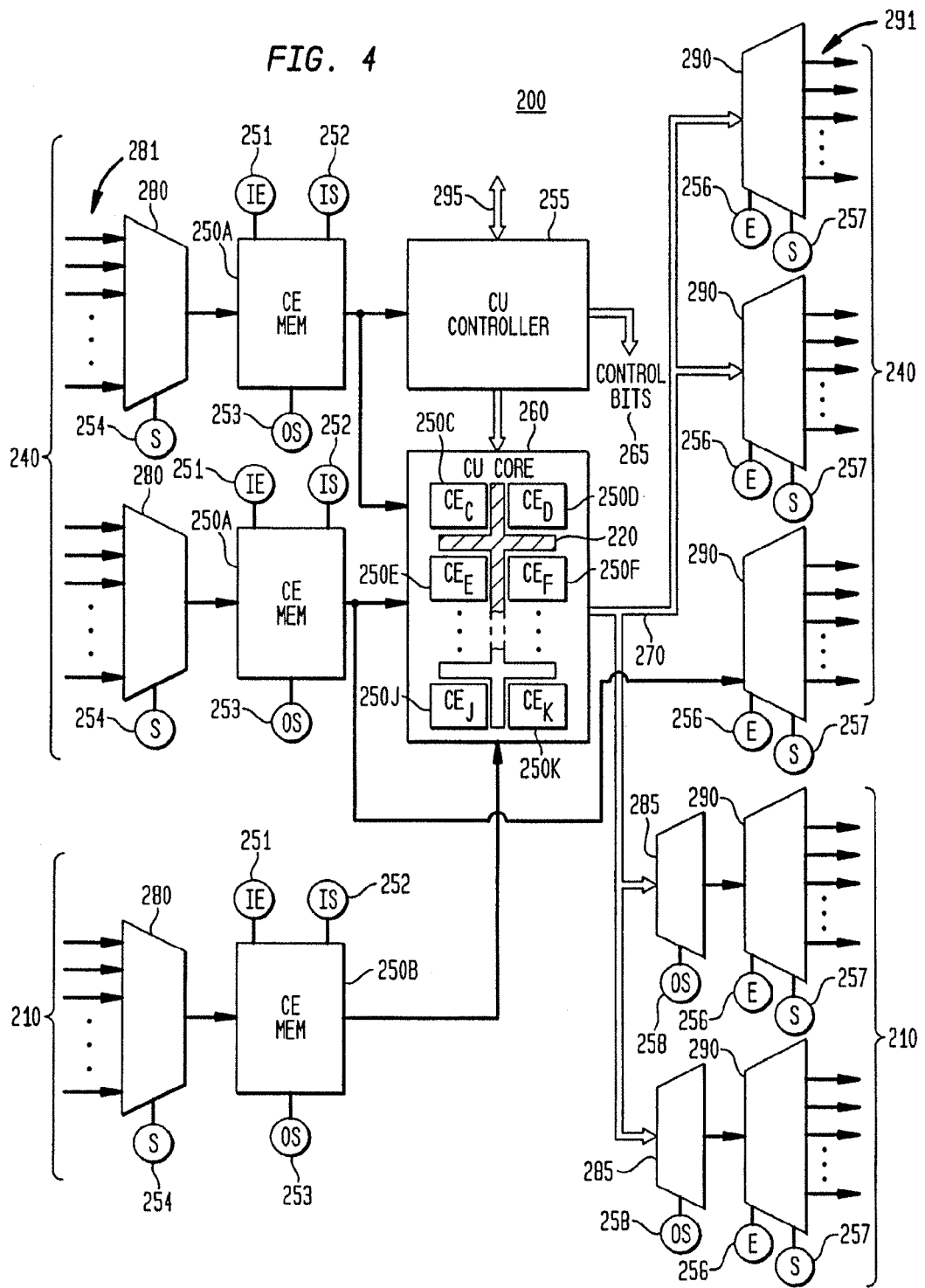
FIG. 4 is a block diagram illustrating, in greater detail, a computational unit of a reconfigurable matrix in accordance with the present invention.

The matrix interconnection network 110 of FIG. 1, and its subset interconnection networks separately illustrated in FIGS. 3 and 4 (Boolean interconnection network 210, data interconnection network 240, and interconnect 220), collectively and generally referred to herein as "interconnect", "interconnection(s)" or "interconnection network(s)", may be implemented generally as known in the art, such as utilizing FPGA interconnection networks or switching fabrics, albeit in a considerably more varied fashion. In the preferred embodiment, the various interconnection networks are implemented as described, for example, in U.S. Pat. Nos. 5,218, 240, 5,336,950, 5,245,227, and 5,144,166, and also as discussed below and as illustrated with reference to FIGS. 7, 8 and 9. These various interconnection networks provide selectable (or switchable) connections between and among the controller 120, the memory 140, the various matrices 150, and the computational units 200 and computational elements 250 discussed below, providing the physical basis for the configuration and reconfiguration referred to herein, in response to and under the control of configuration signaling generally referred to herein as "configuration information". In addition, the various interconnection networks (110, 210, 240 and 220) provide selectable or switchable data, input, output, control and configuration paths, between and among the controller 120, the memory 140, the various matrices 150, and the computational units 200 and computational elements 250, in lieu of any form of traditional or separate input/output busses, data busses, DMA, RAM, configuration and instruction busses.

It should be pointed out, however, that while any given switching or selecting operation of or within the various interconnection networks (110, 210, 240 and 220) may be implemented as known in the art, the design and layout of the various interconnection networks (110, 210, 240 and 220), in accordance with the present invention, are new and novel, as discussed in greater detail below. For example, varying levels of interconnection are provided to correspond to the varying levels of the matrices 150, the computational units 200, and the computational elements 250, discussed below. At the matrix 150 level, in comparison with the prior art FPGA interconnect, the matrix interconnection network 110 is considerably more limited and less "rich", with lesser connection capability in a given area, to reduce capacitance and increase speed of operation. Within a particular matrix 150 or computational unit 200, however, the interconnection network (210, 220 and 240) may be considerably more dense and rich, to provide greater adaptation and reconfiguration capability within a narrow or close locality of reference.

The various matrices or nodes 150 are reconfigurable and heterogeneous, namely, in general, and depending upon the desired configuration: reconfigurable matrix 150A is generally different from reconfigurable matrices 150B through 150N; reconfigurable matrix 150B is generally different from reconfigurable matrices 150A and 150C through 150N; reconfigurable matrix 150C is generally different from reconfigurable matrices 150A, 150B and 150D through 150N, and so on. The various reconfigurable matrices 150 each generally contain a different or varied mix of adaptive and reconfigurable computational (or computation) units (200); the computational units 200, in turn, generally contain a different or varied mix of fixed, application specific computational elements (250), discussed in greater detail below with reference to FIGS. 3 and 4, which may be adaptively connected, configured and reconfigured in various ways to perform varied functions, through the various interconnection networks. In addition to varied internal configurations and reconfigurations, the various matrices 150 may be connected, configured and reconfigured at a higher level, with respect to each of the other matrices 150, through the matrix interconnection network 110, also as discussed in greater detail below.

Several different, insightful and novel concepts are incorporated within the ACE 100 architecture of the present invention, and provide a useful explanatory basis for the real-time operation of the ACE 100 and its inherent advantages.

The first novel concepts of the present invention concern the adaptive and reconfigurable use of application specific, dedicated or fixed hardware units (computational elements 250), and the selection of particular functions for acceleration, to be included within these application specific, dedicated or fixed hardware units (computational elements 250) within the computational units 200 (FIG. 3) of the matrices 150, such as pluralities of multipliers, complex multipliers, and adders, each of which are designed for optimal execution of corresponding multiplication, complex multiplication, and addition functions. Given that the ACE 100 is to be optimized, in the preferred embodiment, for low power consumption, the functions for acceleration are selected based upon power consumption. For example, for a given application such as mobile communication, corresponding C (C+ or C++) or other code may be analyzed for power consumption. Such empirical analysis may reveal, for example, that a small portion of such code, such as 10%, actually consumes 90% of the operating power when executed. In accordance with the present invention, on the basis of such power utilization, this small portion of code is selected for acceleration within certain types of the reconfigurable matrices 150, with the remaining code, for example, adapted to run within matrices 150 configured as controller 120. Additional code may also be selected for acceleration, resulting in an optimization of power consumption by the ACE 100, up to any potential trade-off resulting from design or operational complexity. In addition, as discussed with respect to FIG. 3, other functionality, such as control code, may be accelerated within matrices 150 when configured as finite state machines.

Figure 2:
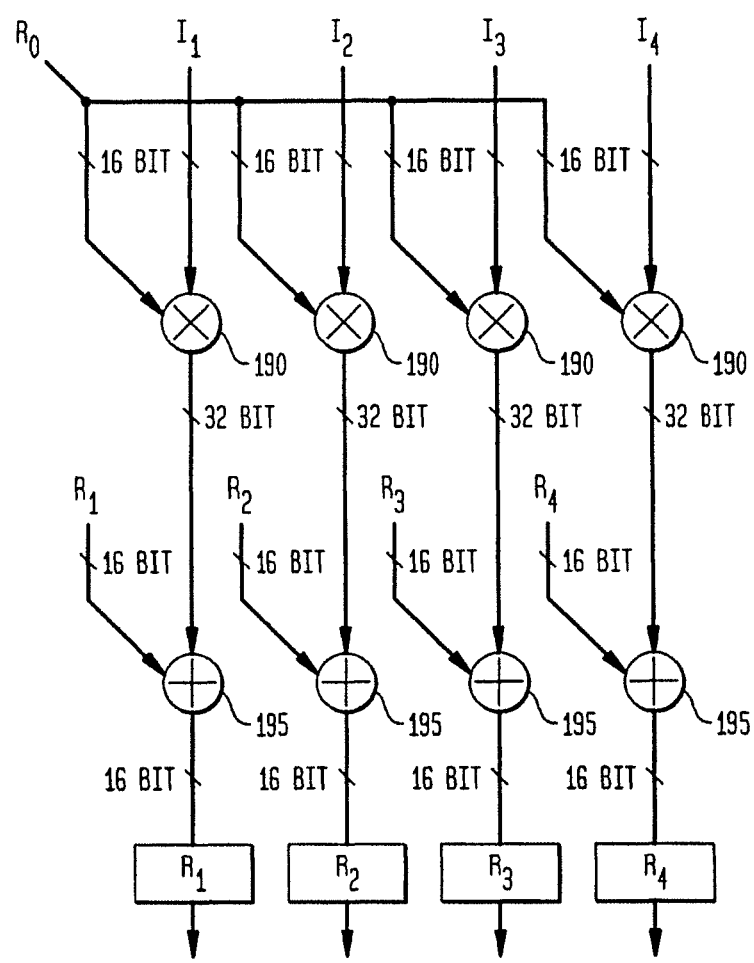
FIG. 2 is a schematic diagram illustrating an exemplary data flow graph in accordance with the present invention.

Next, algorithms or other functions selected for acceleration are converted into a form referred to as a "data flow graph" ("DFG"). A schematic diagram of an exemplary data flow graph, in accordance with the present invention, is illustrated in FIG. 2. As illustrated in FIG. 2, an algorithm or function useful for CDMA voice coding (QCELP (Qualcomm code excited linear prediction) is implemented utilizing four multipliers 190 followed by four adders 195. Through the varying levels of interconnect, the algorithms of this data flow graph are then implemented, at any given time, through the configuration and reconfiguration of fixed computational elements (250), namely, implemented within hardware which has been optimized and configured for efficiency, i.e., a "machine" is configured in real-time which is optimized to perform the particular algorithm. Continuing with the exemplary DFG or FIG. 2, four fixed or dedicated multipliers, as computational elements 250, and four fixed or dedicated adders, also as different computational elements 250, are configured in real-time through the interconnect to perform the functions or algorithms of the particular DFG.

The third and perhaps most significant concept of the present invention, and a marked departure from the concepts and precepts of the prior art, is the concept of reconfigurable "heterogeneity" utilized to implement the various selected algorithms mentioned above. As indicated above, prior art reconfigurability has relied exclusively on homogeneous FPGAs, in which identical blocks of logic gates are repeated as an array within a rich, programmable interconnect, with the interconnect subsequently configured to provide connections between and among the identical gates to implement a particular function, albeit inefficiently and often with routing and combinatorial problems. In stark contrast, in accordance with the present invention, within computation units 200, different computational elements (250) are implemented directly as correspondingly different fixed (or dedicated) application specific hardware, such as dedicated multipliers, complex multipliers, and adders. Utilizing interconnect (210 and 220), these differing, heterogeneous computational elements (250) may then be adaptively configured, in realtime, to perform the selected algorithm, such as the performance of discrete cosine transformations often utilized in mobile communications. For the data flow graph example of FIG. 2, four multipliers and four adders will be configured, i.e., connected in real-time, to perform the particular algorithm. As a consequence, in accordance with the present invention, different ("heterogeneous") computational elements (250) are configured and reconfigured, at any given time, to optimally perform a given algorithm or other function. In addition, for repetitive functions, a given instantiation or configuration of computational elements may also remain in place over time, i.e., unchanged, throughout the course of such repetitive calculations.

The temporal nature of the ACE 100 architecture should also be noted. At any given instant of time, utilizing different levels of interconnect (110, 210, 240 and 220), a particular configuration may exist within the ACE 100 which has been optimized to perform a given function or implement a particular algorithm. At another instant in time, the configuration may be changed, to interconnect other computational elements (250) or connect the same computational elements 250 differently, for the performance of another function or algorithm. Two important features arise from this temporal reconfigurability. First, as algorithms may change over time to, for example, implement a new technology standard, the ACE 100 may co-evolve and be reconfigured to implement the new algorithm. For a simplified example, a fifth multiplier and a fifth adder may be incorporated into the DFG of FIG. 2 to execute a correspondingly new algorithm, with additional interconnect also potentially utilized to implement any additional bussing functionality. Second, because computational elements are interconnected at one instant in time, as an instantiation of a given algorithm, and then reconfigured at another instant in time for performance of another, different algorithm, gate (or transistor) utilization is maximized, providing significantly better performance than the most efficient ASICs relative to their activity factors.

This temporal reconfigurability of computational elements 250, for the performance of various different algorithms, also illustrates a conceptual distinction utilized herein between configuration and reconfiguration, on the one hand, and programming or reprogrammability, on the other hand. Typical programmability utilizes a pre-existing group or set of functions, which may be called in various orders, over time, to implement a particular algorithm. In contrast, configurability and reconfigurability, as used herein, includes the additional capability of adding or creating new functions which were previously unavailable or non-existent.

Next, the present invention also utilizes a tight coupling (or interdigitation) of data and configuration (or other control) information, within one, effectively continuous stream of information. This coupling or commingling of data and configuration information, referred to as a "silverware" module, is the subject of a separate, related patent application. For purposes of the present invention, however, it is sufficient to note that this coupling of data and configuration information into one information (or bit) stream helps to enable real-time reconfigurability of the ACE 100, without a need for the (often unused) multiple, overlaying networks of hardware interconnections of the prior art. For example, as an analogy, a particular, first configuration of computational elements at a particular, first period of time, as the hardware to execute a corresponding algorithm during or after that first period of time, may be viewed or conceptualized as a hardware analog of "calling" a subroutine in software which may perform the same algorithm. As a consequence, once the configuration of the computational elements has occurred (i.e., is in place), as directed by the configuration information, the data for use in the algorithm is immediately available as part of the silverware module. The same computational elements may then be reconfigured for a second period of time, as directed by second configuration information, for execution of a second, different algorithm, also utilizing immediately available data. The immediacy of the data, for use in the configured computational elements, provides a one or two clock cycle hardware analog to the multiple and separate software steps of determining a memory address and fetching stored data from the addressed registers. This has the further result of additional efficiency, as the configured computational elements may execute, in comparatively few clock cycles, an algorithm which may require orders of magnitude more clock cycles for execution if called as a subroutine in a conventional microprocessor or DSP.

This use of silverware modules, as a commingling of data and configuration information, in conjunction with the real-time reconfigurability of a plurality of heterogeneous and fixed computational elements 250 to form adaptive, different and heterogeneous computation units 200 and matrices 150, enables the ACE 100 architecture to have multiple and different modes of operation. For example, when included within a hand-held device, given a corresponding silverware module, the ACE 100 may have various and different operating modes as a cellular or other mobile telephone, a music player, a pager, a personal digital assistant, and other new or existing functionalities. In addition, these operating modes may change based upon the physical location of the device; for example, when configured as a CDMA mobile telephone for use in the United States, the ACE 100 may be reconfigured as a GSM mobile telephone for use in Europe.

Referring again to FIG. 1, the functions of the controller 120 (preferably matrix (KARC) 150A and matrix (MARC) 150B, configured as finite state machines) may be explained with reference to a silverware module, namely, the tight coupling of data and configuration information within a single stream of information, with reference to multiple potential modes of operation, with reference to the reconfigurable matrices 150, and with reference to the reconfigurable computation units 200 and the computational elements 150 illustrated in FIG. 3. As indicated above, through a silverware module, the ACE 100 may be configured or reconfigured to perform a new or additional function, such as an upgrade to a new technology standard or the addition of an entirely new function, such as the addition of a music function to a mobile communication device. Such a silverware module may be stored in the matrices 150 of memory 140, or may be input from an external (wired or wireless) source through, for example, matrix interconnection network 110. In the preferred embodiment, one of the plurality of matrices 150 is configured to decrypt such a module and verify its validity, for security purposes. Next, prior to any configuration or reconfiguration of existing ACE 100 resources, the controller 120, through the matrix (KARC) 150A, checks and verifies that the configuration or reconfiguration may occur without adversely affecting any pre-existing functionality, such as whether the addition of music functionality would adversely affect pre-existing mobile communications functionality. In the preferred embodiment, the system requirements for such configuration or reconfiguration are included within the silverware module, for use by the matrix (KARC) 150A in performing this evaluative function. If the configuration or reconfiguration may occur without such adverse affects, the silverware module is allowed to load into the matrices 150 of memory 140, with the matrix (KARC) 150A setting up the DMA engines within the matrices 150C and 150D of the memory 140 (or other stand-alone DMA engines of a conventional memory). If the configuration or reconfiguration would or may have such adverse affects, the matrix (KARC) 150A does not allow the new module to be incorporated within the ACE 100.

Continuing to refer to FIG. 1, the matrix (MARC) 150B manages the scheduling of matrix 150 resources and the timing of any corresponding data, to synchronize any configuration or reconfiguration of the various computational elements 250 and computation units 200 with any corresponding input data and output data. In the preferred embodiment, timing information is also included within a silverware module, to allow the matrix (MARC) 150B through the various interconnection networks to direct a reconfiguration of the various matrices 150 in time, and preferably just in time, for the reconfiguration to occur before corresponding data has appeared at any inputs of the various reconfigured computation units 200. In addition, the matrix (MARC) 150B may also perform any residual processing which has not been accelerated within any of the various matrices 150. As a consequence, the matrix (MARC) 150B may be viewed as a control unit which "calls" the configurations and reconfigurations of the matrices 150, computation units 200 and computational elements 250, in real-time, in synchronization with any corresponding data to be utilized by these various reconfigurable hardware units, and which performs any residual or other control processing. Other matrices 150 may also include this control functionality, with any given matrix 150 capable of calling and controlling a configuration and reconfiguration of other matrices 150.

FIG. 3 is a block diagram illustrating, in greater detail, a reconfigurable matrix 150 with a plurality of computation units 200 (illustrated as computation units 200A through 200N), and a plurality of computational elements 250 (illustrated as computational elements 250A through 250Z), and provides additional illustration of the preferred types of computational elements 250 and a useful summary of the present invention. As illustrated in FIG. 3, any matrix 150 generally includes a matrix controller 230, a plurality of computation (or computational) units 200, and as logical or conceptual subsets or portions of the matrix interconnect network 110, a data interconnect network 240 and a Boolean interconnect network 210. As mentioned above, in the preferred embodiment, at increasing "depths" within the ACE 100 architecture, the interconnect networks become increasingly rich, for greater levels of adaptability and reconfiguration. The Boolean interconnect network 210, also as mentioned above, provides the reconfiguration and data interconnection capability between and among the various computation units 200, and is preferably small (i.e., only a few bits wide), while the data interconnect network 240 provides the reconfiguration and data interconnection capability for data input and output between and among the various computation units 200, and is preferably comparatively large (i.e., many bits wide). It should be noted, however, that while conceptually divided into reconfiguration and data capabilities, any given physical portion of the matrix interconnection network 110, at any given time, may be operating as either the Boolean interconnect network 210, the data interconnect network 240, the lowest level interconnect 220 (between and among the various computational elements 250), or other input, output, or connection functionality.

Continuing to refer to FIG. 3, included within a computation unit 200 are a plurality of computational elements 250, illustrated as computational elements 250A through 250Z (individually and collectively referred to as computational elements 250), and additional interconnect 220. The interconnect 220 provides the reconfigurable interconnection capability and input/output paths between and among the various computational elements 250. As indicated above, each of the various computational elements 250 consist of dedicated, application specific hardware designed to perform a given task or range of tasks, resulting in a plurality of different, fixed computational elements 250. Utilizing the interconnect 220, the fixed computational elements 250 may be reconfigurably connected together into adaptive and varied computational units 200, which also may be further reconfigured and interconnected, to execute an algorithm or other function, at any given time, such as the quadruple multiplications and additions of the DFG of FIG. 2, utilizing the interconnect 220, the Boolean network 210, and the matrix interconnection network 110.

In the preferred embodiment, the various computational elements 250 are designed and grouped together, into the various adaptive and reconfigurable computation units 200 (as illustrated, for example, in FIG. 5A through 9). In addition to computational elements 250 which are designed to execute a particular algorithm or function, such as multiplication or addition, other types of computational elements 250 are also utilized in the preferred embodiment. As illustrated in FIG. 3, computational elements 250A and 250B implement memory, to provide local memory elements for any given calculation or processing function (compared to the more "remote" memory 140). In addition, computational elements 250I, 250J, 250K and 250L are configured to implement finite state machines (using, for example, the computational elements illustrated in FIGS. 7, 8 and 9), to provide local processing capability (compared to the more "remote" matrix (MARC) 15SOB), especially suitable for complicated control processing.

With the various types of different computational elements 250 which may be available, depending upon the desired functionality of the ACE 100, the computation units 200 may be loosely categorized. A first category of computation units 200 includes computational elements 250 performing linear operations, such as multiplication, addition, finite impulse response filtering, and so on (as illustrated below, for example, with reference to FIG. 5A through 5E and FIG. 6). A second category of computation units 200 includes computational elements 250 performing non-linear operations, such as discrete cosine transformation, trigonometric calculations, and complex multiplications. A third type of computation unit 200 implements a finite state machine, such as computation unit 200C as illustrated in FIG. 3 and as illustrated in greater detail below with respect to FIGS. 7 through 9), particularly useful for complicated control sequences, dynamic scheduling, and input/output management, while a fourth type may implement memory and memory management, such as computation unit 200A as illustrated in FIG. 3.

Lastly, a fifth type of computation unit 200 may be included to perform bit-level manipulation, such as for encryption, decryption, channel coding, Viterbi decoding, and packet and protocol processing (such as Internet Protocol processing).

In the preferred embodiment, in addition to control from other matrices or nodes 150, a matrix controller 230 may also be included within any given matrix 150, also to provide greater locality of reference and control of any reconfiguration processes and any corresponding data manipulations. For example, once a reconfiguration of computational elements 250 has occurred within any given computation unit 200, the matrix controller 230 may direct that that particular instantiation (or configuration) remain intact for a certain period of time to, for example, continue repetitive data processing for a given application.

FIG. 4 is a block diagram illustrating, in greater detail, an exemplary or representative computation unit 200 of a reconfigurable matrix 150 in accordance with the present invention. As illustrated in FIG. 4, a computation unit 200 typically includes a plurality of diverse, heterogeneous and fixed computational elements 250, such as a plurality of memory computational elements 250A and 250B, and forming a computational unit ("CU") core 260, a plurality of algorithmic or finite state machine computational elements 250C through 250K. As discussed above, each computational element 250, of the plurality of diverse computational elements 250, is a fixed or dedicated, application specific circuit, designed and having a corresponding logic gate layout to perform a specific function or algorithm, such as addition or multiplication. In addition, the various memory computational elements 250A and 250B may be implemented with various bit depths, such as RAM (having significant depth), or as a register, having a depth of 1 or 2 bits.

Forming the conceptual data and Boolean interconnect networks 240 and 210, respectively, the exemplary computation unit 200 also includes a plurality of input multiplexers 280, a plurality of input lines (or wires) 281, and for the output of the CU core 260 (illustrated as line or wire 270), a plurality of output demultiplexers 285 and 290, and a plurality of output lines (or wires) 291. Through the input multiplexers 280, an appropriate input line 281 may be selected for input use in data transformation and in the configuration and interconnection processes, and through the output demultiplexers 285 and 290, an output or multiple outputs may be placed on a selected output line 291, also for use in additional data transformation and in the configuration and interconnection processes.

In the preferred embodiment, the selection of various input and output lines 281 and 291, and the creation of various connections through the interconnect (210, 220 and 240), is under control of control bits 265 from the computational unit controller 255, as discussed below. Based upon these control bits 265, any of the various input enables 251, input selects 252, output selects 253, MUX selects 254, DEMUX enables 256, DEMUX selects 257, and DEMUX output selects 258, may be activated or deactivated.

The exemplary computation unit 200 includes a computation unit controller 255 which provides control, through control bits 265, over what each computational element 250, interconnect (210, 220 and 240), and other elements (above) does with every clock cycle. Not separately illustrated, through the interconnect (210, 220 and 240), the various control bits 265 are distributed, as may be needed, to the various portions of the computation unit 200, such as the various input enables 251, input selects 252, output selects 253, MUX selects 254, DEMUX enables 256, DEMUX selects 257, and DEMUX output selects 258. The CU controller 295 also includes one or more lines 295 for reception of control (or configuration) information and transmission of status information.

As mentioned above, the interconnect may include a conceptual division into a data interconnect network 240 and a Boolean interconnect network 210, of varying bit widths, as mentioned above. In general, the (wider) data interconnection network 240 is utilized for creating configurable and reconfigurable connections, for corresponding routing of data and configuration information. The (narrower) Boolean interconnect network 210, while also utilized for creating configurable and reconfigurable connections, is utilized for control of logic (or Boolean) decisions of the various data flow graphs, generating decision nodes in such DFGs, and may also be used for data routing within such DFGs.

FIGS. 5A through 5E are block diagrams illustrating, in detail, exemplary fixed and specific computational elements, forming computational units, in accordance with the present invention. As will be apparent from review of these Figures, many of the same fixed computational elements are utilized, with varying configurations, for the performance of different algorithms.

Figure 5A:
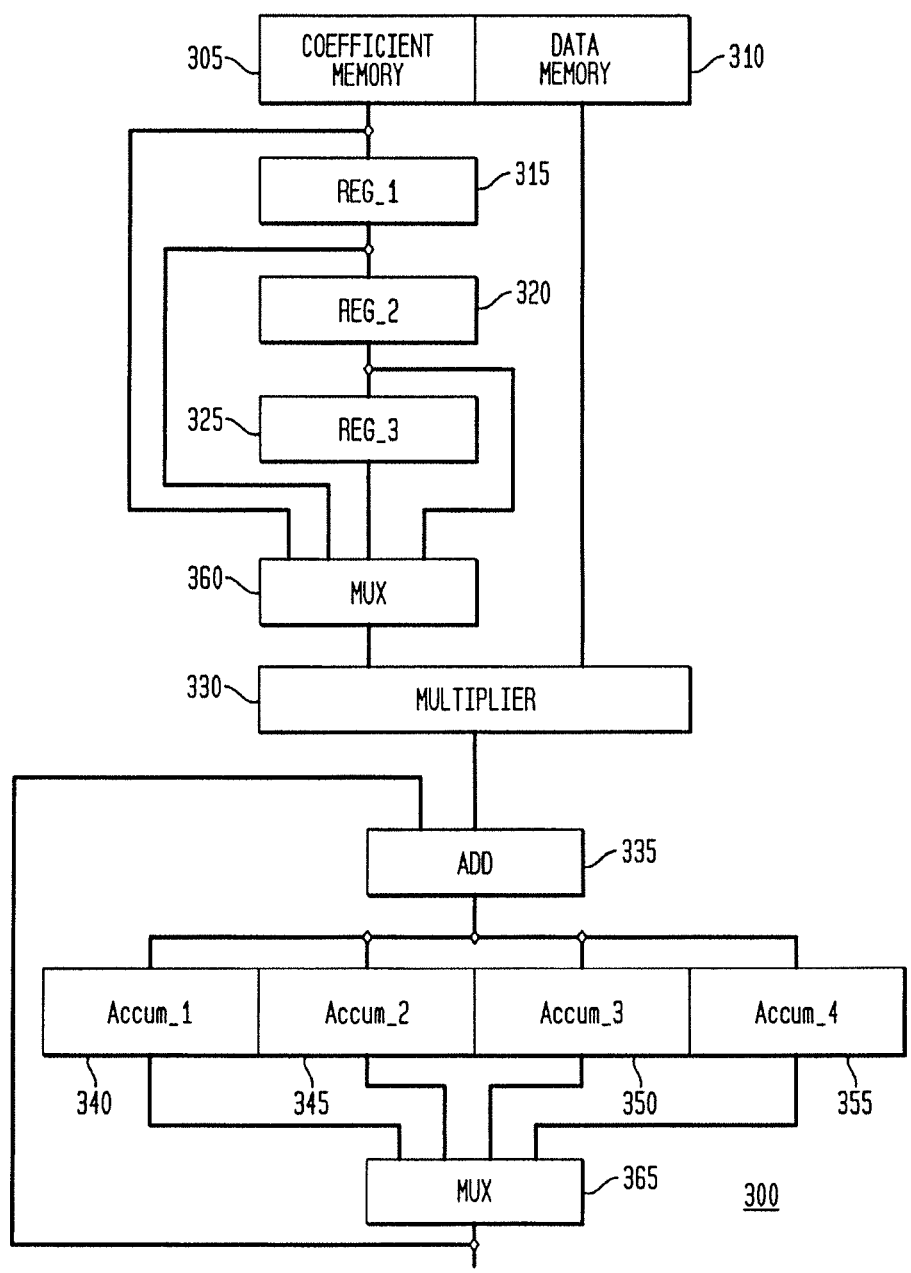
FIGS. 5A through 5E are block diagrams illustrating, in detail, exemplary fixed and specific computational elements, forming computational units, in accordance with the present invention.

FIG. 5A is a block diagram illustrating a four-point asymetric finite impulse response (FIR) filter computational unit 300. As illustrated, this exemplary computational unit 300 includes a particular, first configuration of a plurality of fixed computational elements, including coefficient memory 305, data memory 310, registers 315, 320 and 325, multiplier 330, adder 335, and accumulator registers 340, 345, 350 and 355, with multiplexers (MUXes) 360 and 365 forming a portion of the interconnection network (210, 220 and 240).

Figure 5B:
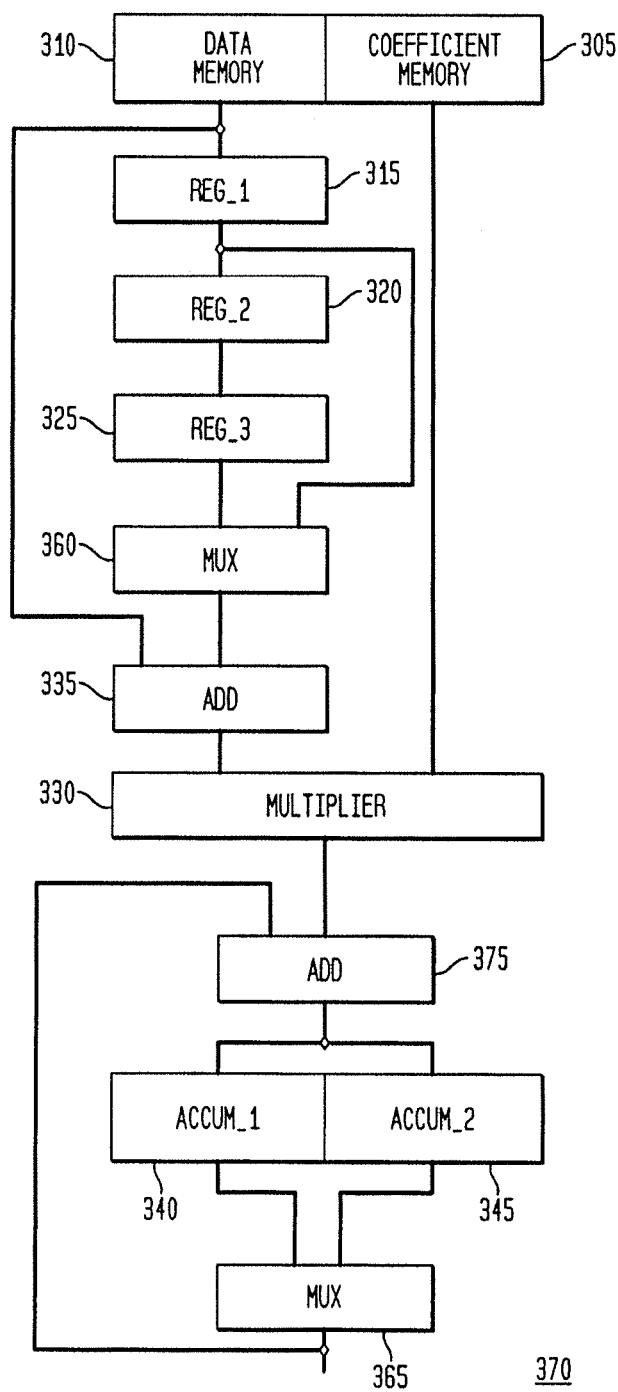

FIG. 5B is a block diagram illustrating a two-point symmetric finite impulse response (FIR) filter computational unit 370. As illustrated, this exemplary computational unit 370 includes a second configuration of a plurality of fixed computational elements, including coefficient memory 305, data memory 310, registers 315, 320 and 325, multiplier 330, adder 335, second adder 375, and accumulator registers 340 and 345, also with multiplexers (MUXes) 360 and 365 forming a portion of the interconnection network (210, 220 and 240).

Figure 5C:
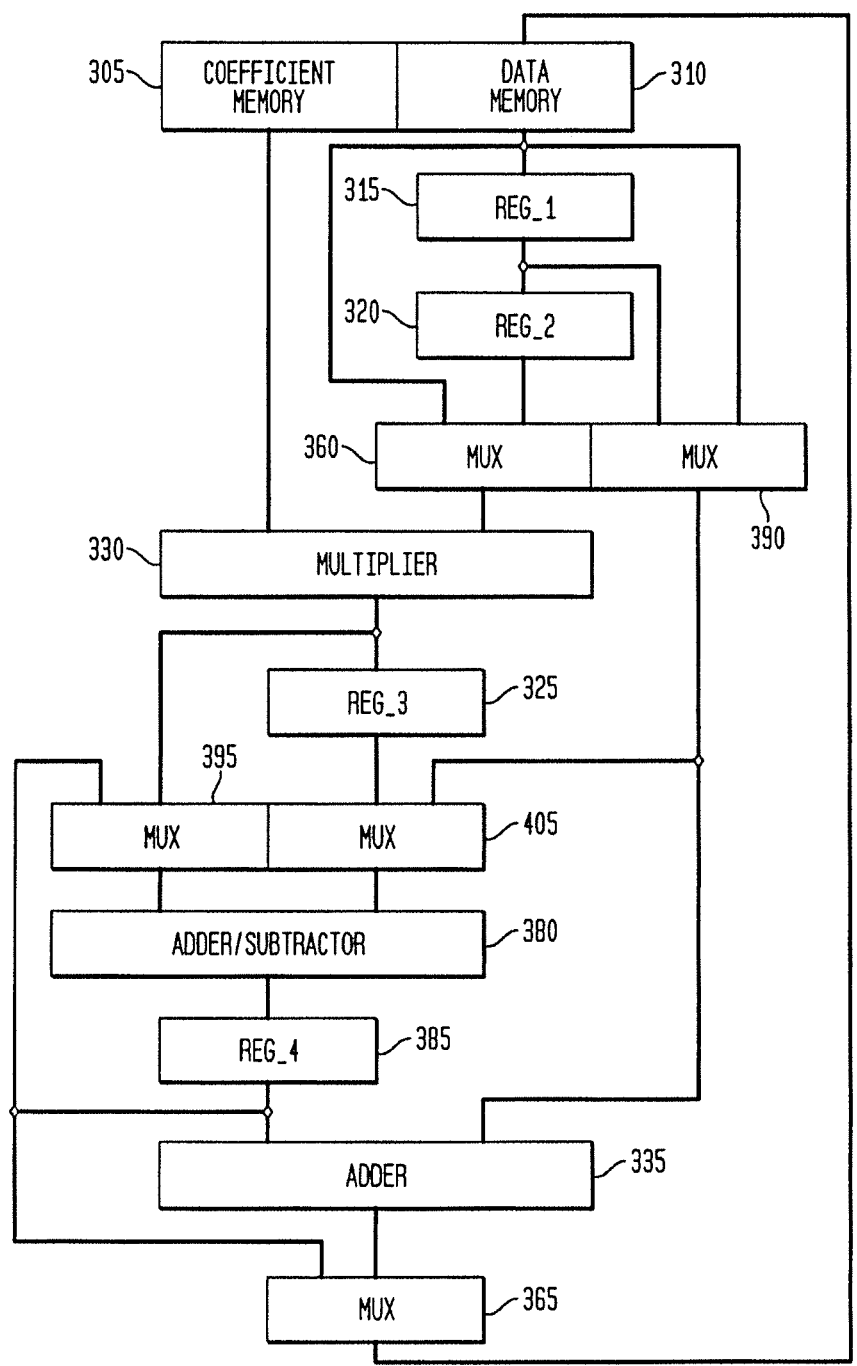

FIG. 5C is a block diagram illustrating a subunit for a fast Fourier transform (FFT) computational unit 400. As illustrated, this exemplary computational unit 400 includes a third configuration of a plurality of fixed computational elements, including coefficient memory 305, data memory 310, registers 315, 320, 325 and 385, multiplier 330, adder 335, and adder/subtractor 380, with multiplexers (MUXes) 360, 365, 390, 395 and 405 forming a portion of the interconnection network (210, 220 and 240).

Figure 5D:
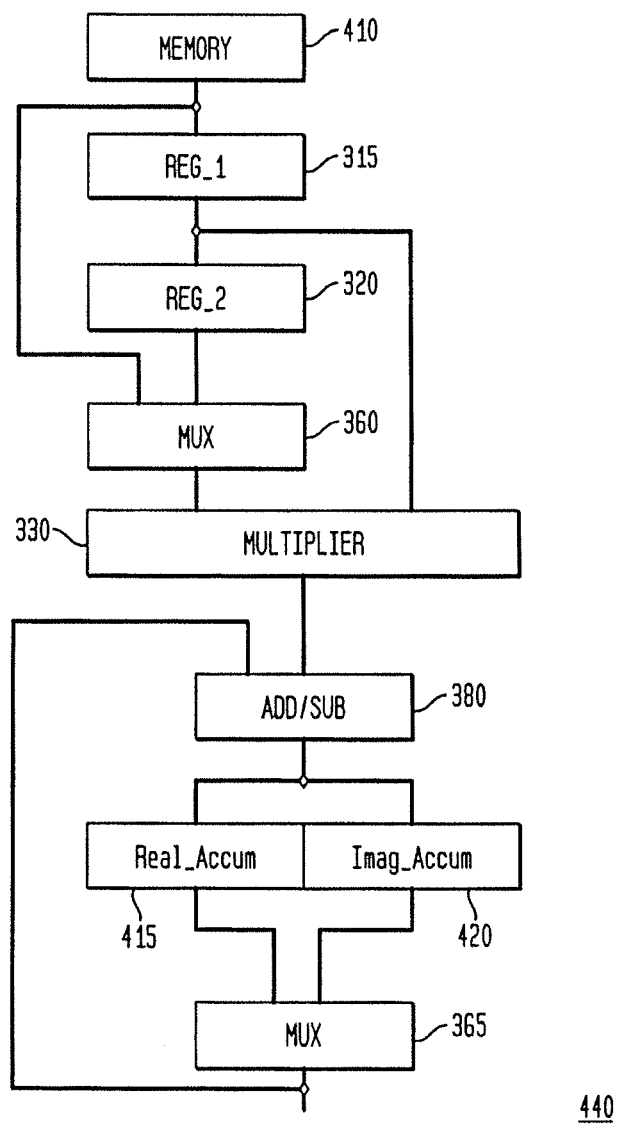

FIG. 5D is a block diagram illustrating a complex finite impulse response (FIR) filter computational unit 440. As illustrated, this exemplary computational unit 440 includes a fourth configuration of a plurality of fixed computational elements, including memory 410, registers 315 and 320, multiplier 330, adder/subtractor 380, and real and imaginary accumulator registers 415 and 420, also with multiplexers (MUXes) 360 and 365 forming a portion of the interconnection network (210, 220 and 240).

Figure 5E:
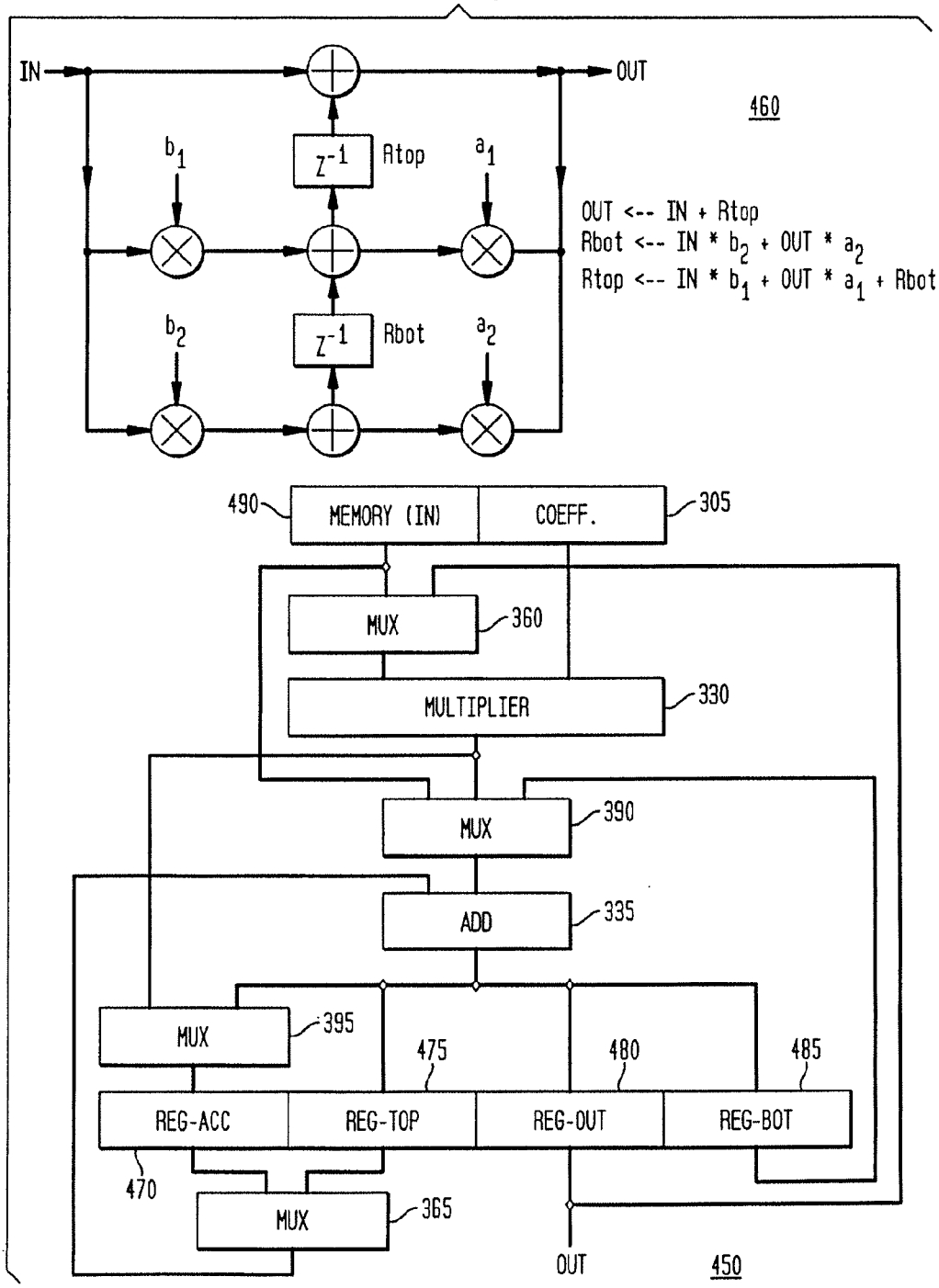
Figure 6:
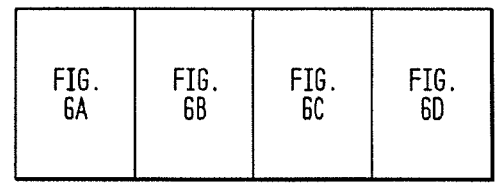
FIGS. 6A-6D are a block diagram illustrating, in detail, a preferred multifunction adaptive computational unit having a plurality of different, fixed computational elements, in accordance with the present invention.
Figure 6A:
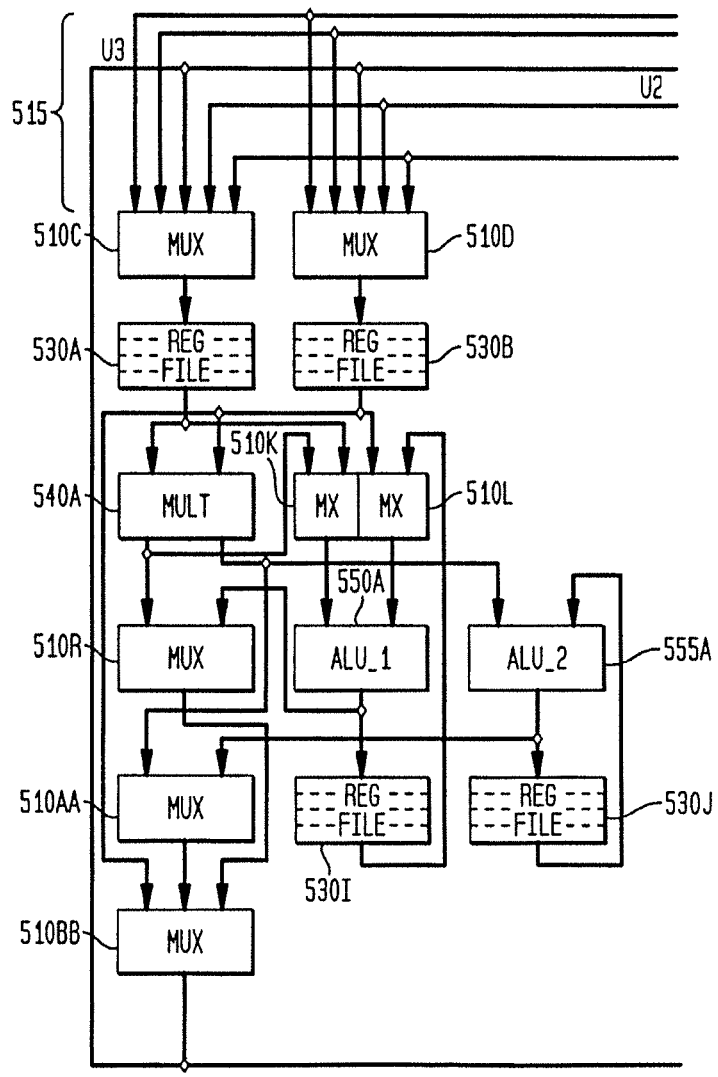
Figure 6B:
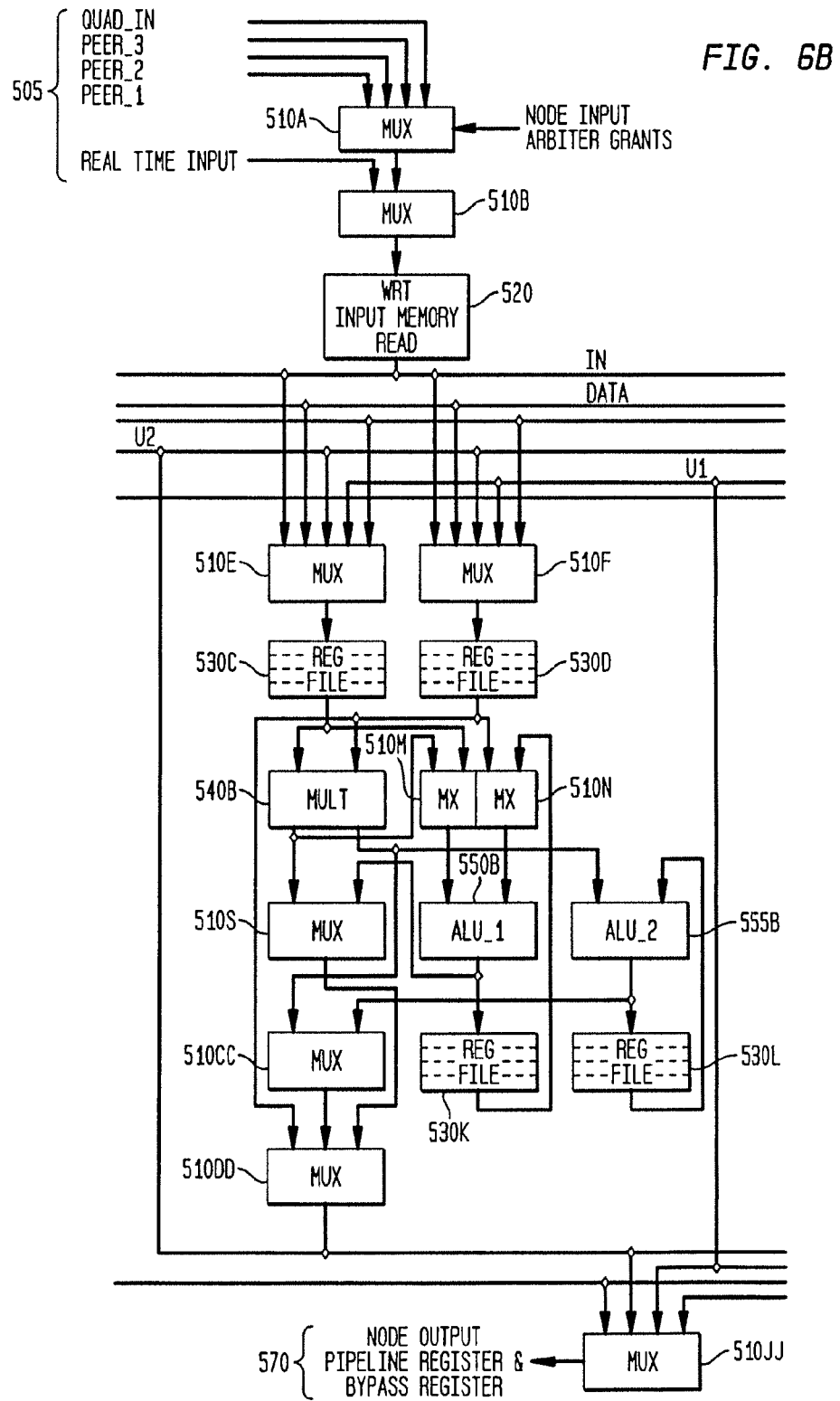
Figure 6C:
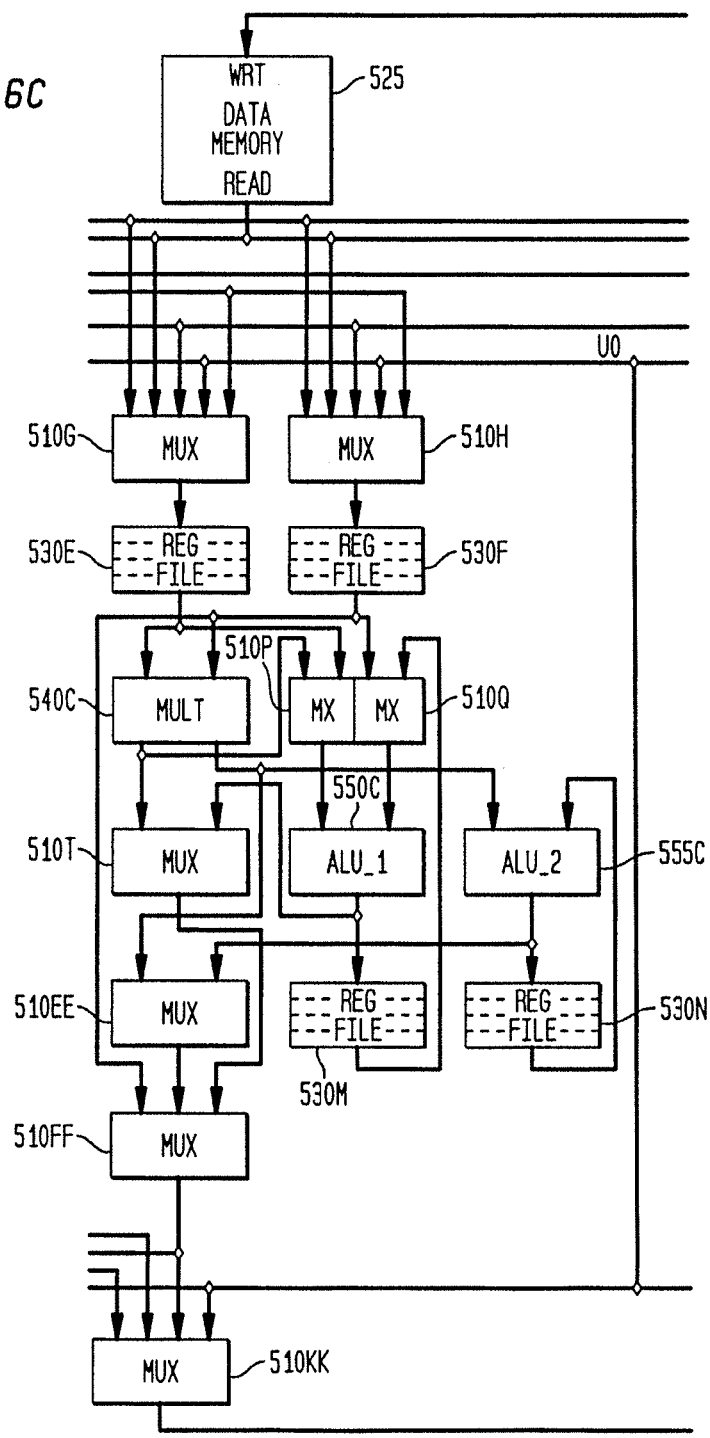
Figure 6D:
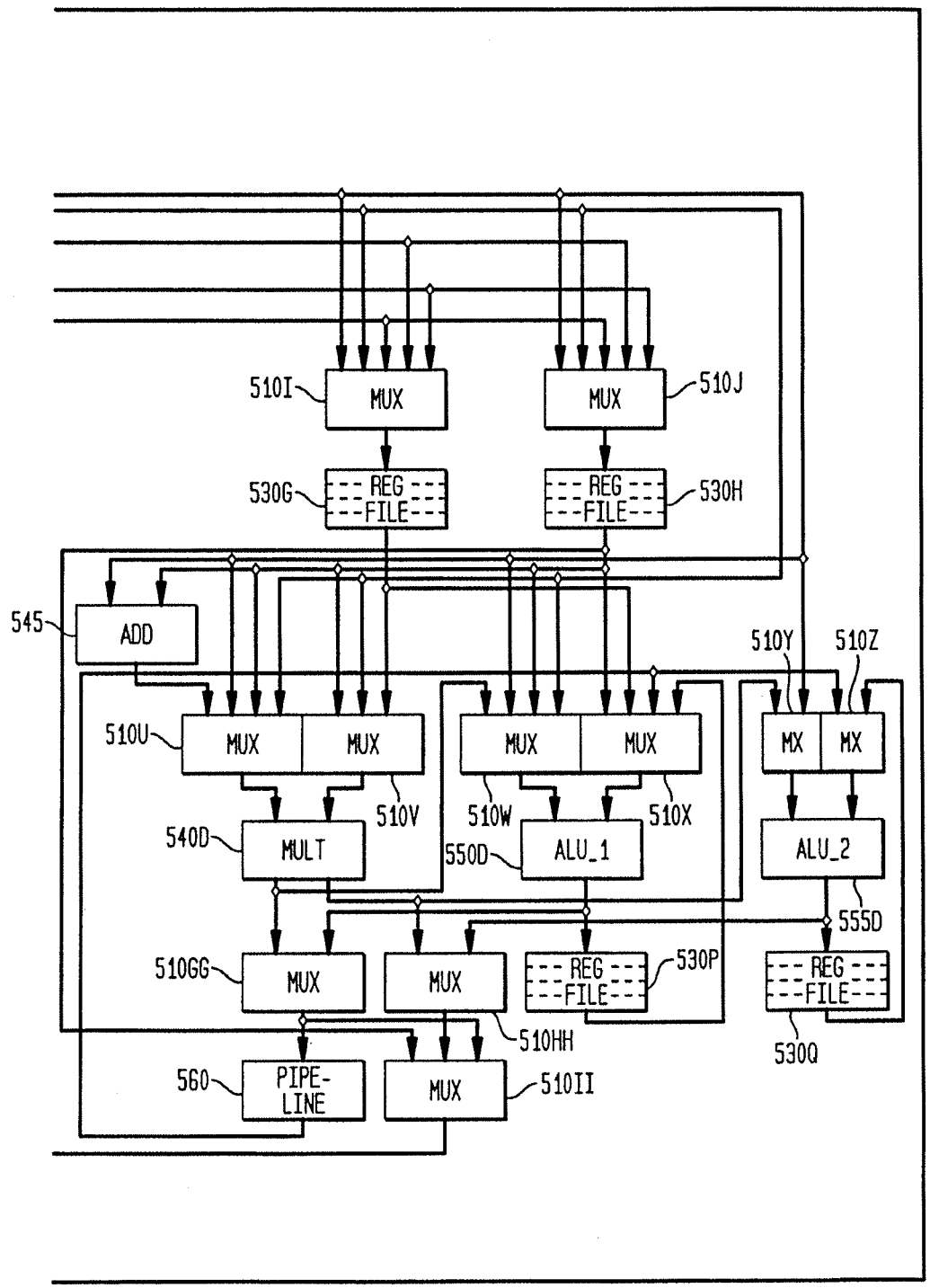

FIG. 5E is a block diagram illustrating a biquad infinite impulse response (IIR) filter computational unit 450, with a corresponding data flow graph 460. As illustrated, this exemplary computational unit 450 includes a fifth configuration of a plurality of fixed computational elements, including coefficient memory 305, input memory 490, registers 470, 475, 480 and 485, multiplier 330, and adder 335, with multiplexers (MUXes) 360, 365, 390 and 395 forming a portion of the interconnection network (210, 220 and 240).

FIGS. 6A-6D is a block diagram illustrating, in detail, a preferred multifunction adaptive computational unit 500 having a plurality of different, fixed computational elements, in accordance with the present invention. When configured accordingly, the adaptive computation unit 500 performs each of the various functions previously illustrated with reference to FIG. 5A though 5E, plus other functions such as discrete cosine transformation. As illustrated, this multifunction adaptive computational unit 500 includes capability for a plurality of configurations of a plurality of fixed computational elements, including input memory 520, data memory 525, registers 530 (illustrated as registers 530A through 530Q), multipliers 540 (illustrated as multipliers 540A through 540D), adder 545, first arithmetic logic unit (ALU) 550 (illustrated as ALU_1s 550A through 550D), second arithmetic logic unit (ALU) 555 (illustrated as ALU_2s 555A through 555D), and pipeline (length 1) register 560, with inputs 505, lines 515, outputs 570, and multiplexers (MUXes or MXes) 510 (illustrates as MUXes and MXes 510A through 51 OKK) forming an interconnection network (210, 220 and 240). The two different ALUs 550 and 555 are preferably utilized, for example, for parallel addition and subtraction operations, particularly useful for radix 2 operations in discrete cosine transformation.

Figure 7A:
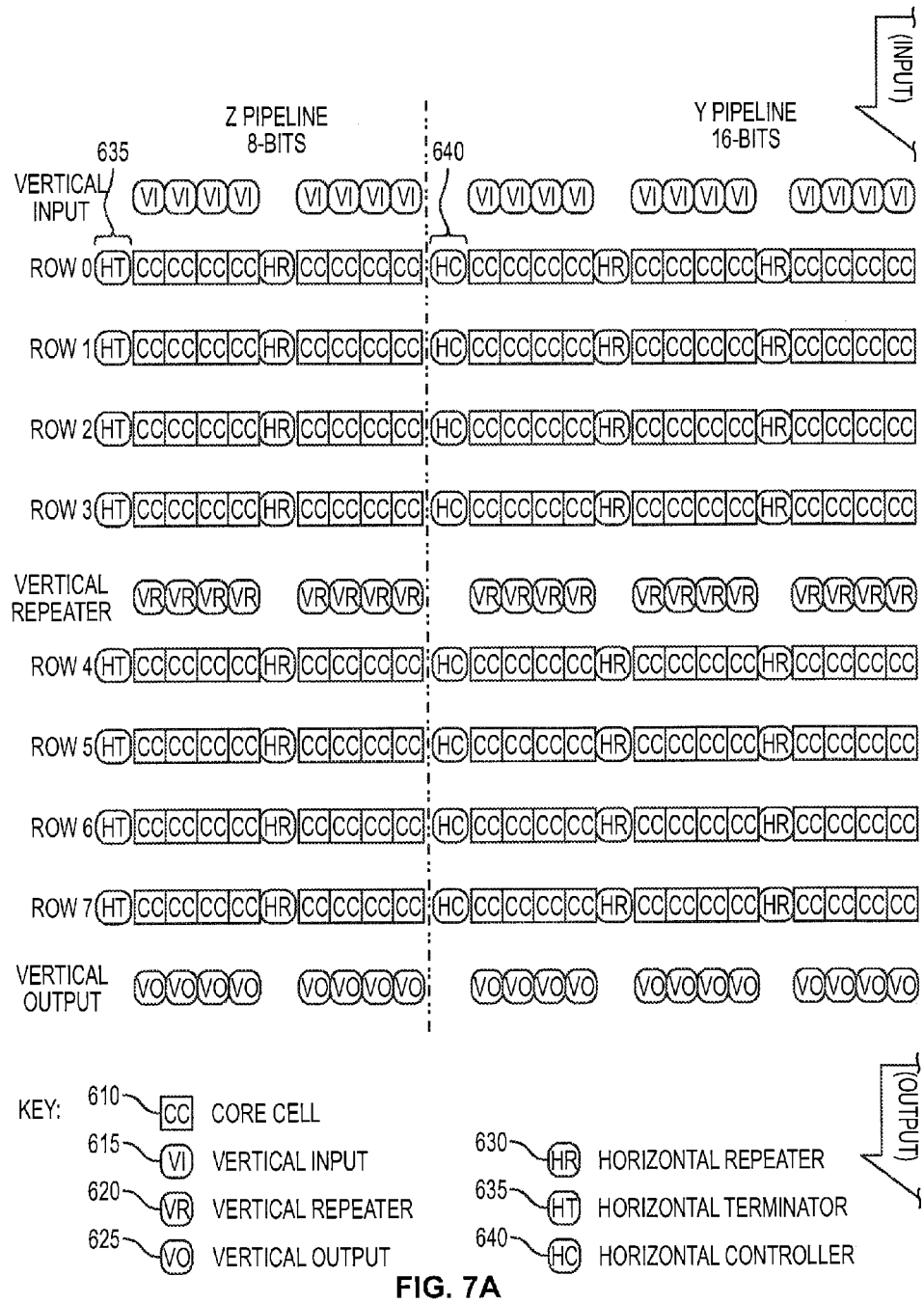
FIGS. 7A-7B are a block diagram illustrating, in detail, a preferred adaptive logic processor computational unit having a plurality of fixed computational elements, in accordance with the present invention.
Figure 7B:
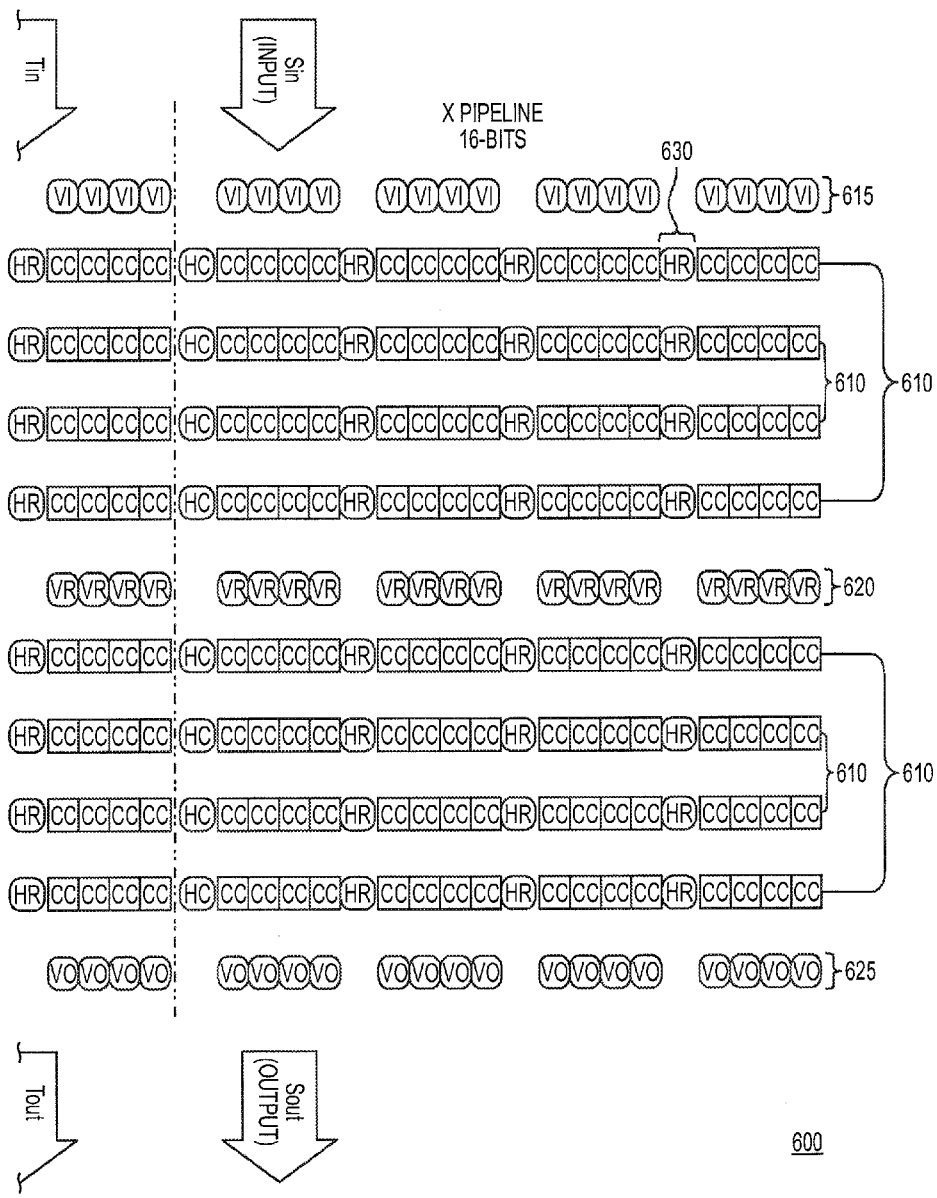

FIGS. 7A-7B is a block diagram illustrating, in detail, a preferred adaptive logic processor (ALP) computational unit 600 having a plurality of fixed computational elements, in accordance with the present invention. The ALP 600 is highly adaptable, and is preferably utilized for input/output configuration, finite state machine implementation, general field programmability, and bit manipulation. The fixed computational element of ALP 600 is a portion (650) of each of the plurality of adaptive core cells (CCs) 610 (FIG. 8), as separately illustrated in FIG. 9. An interconnection network (210, 220 and 240) is formed from various combinations and permutations of the pluralities of vertical inputs (VIs) 615, vertical repeaters (VRs) 620, vertical outputs (VOs) 625, horizontal repeaters (HRs) 630, horizontal terminators (HTs) 635, and horizontal controllers (HCs) 640.

Figure 8:
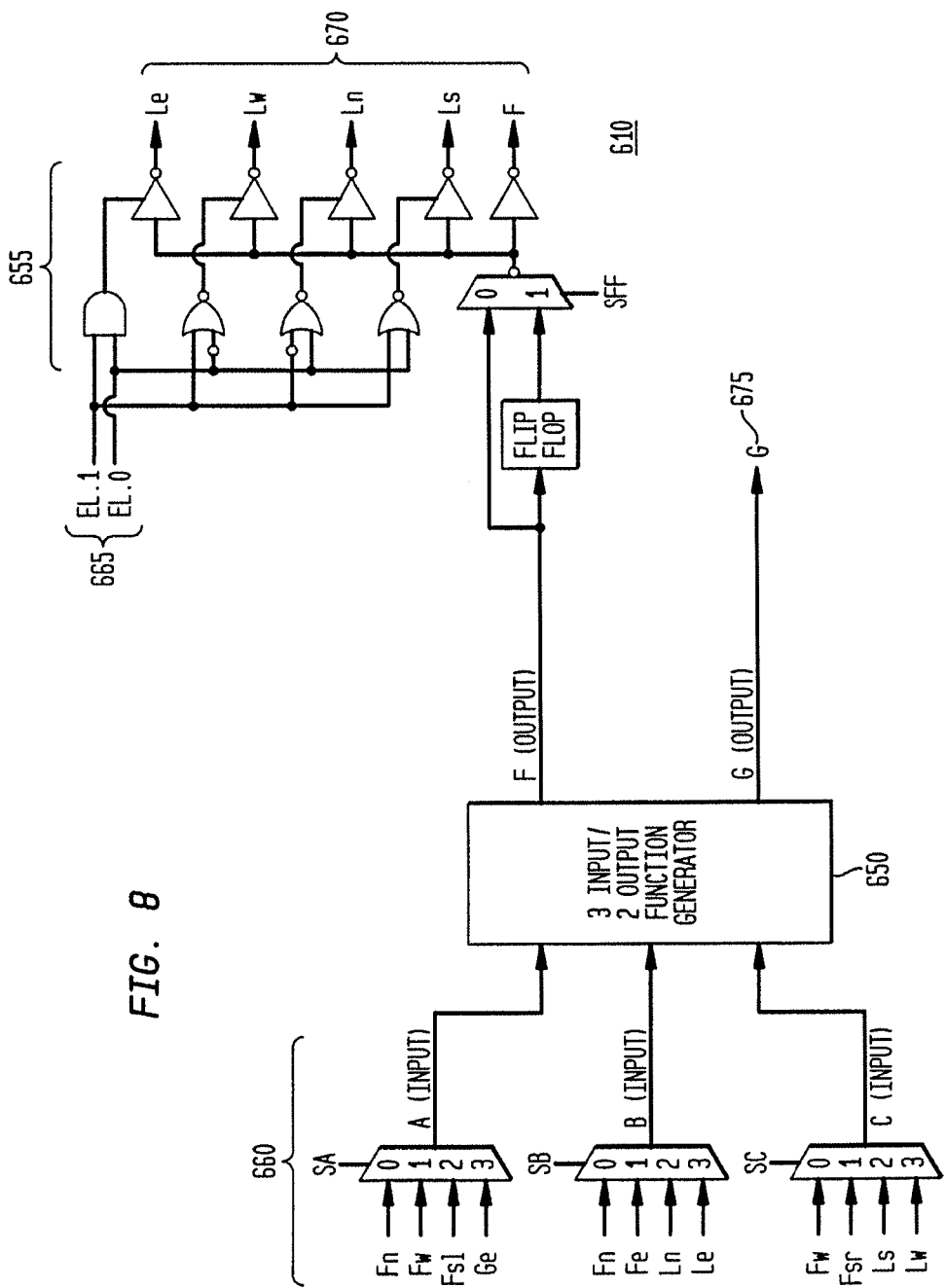
FIG. 8 is a block diagram illustrating, in greater detail, a preferred core cell of an adaptive logic processor computational unit with a fixed computational element, in accordance with the present invention.

FIG. 8 is a block diagram illustrating, in greater detail, a preferred core cell 610 of an adaptive logic processor computational unit 600 with a fixed computational element 650, in accordance with the present invention. The fixed computational element is a 3input--2 output function generator 550, separately illustrated in FIG. 9. The preferred core cell 610 also includes control logic 655, control inputs 665, control outputs 670 (providing output interconnect), output 675, and inputs (with interconnect muxes) 660 (providing input interconnect).

Figure 9:
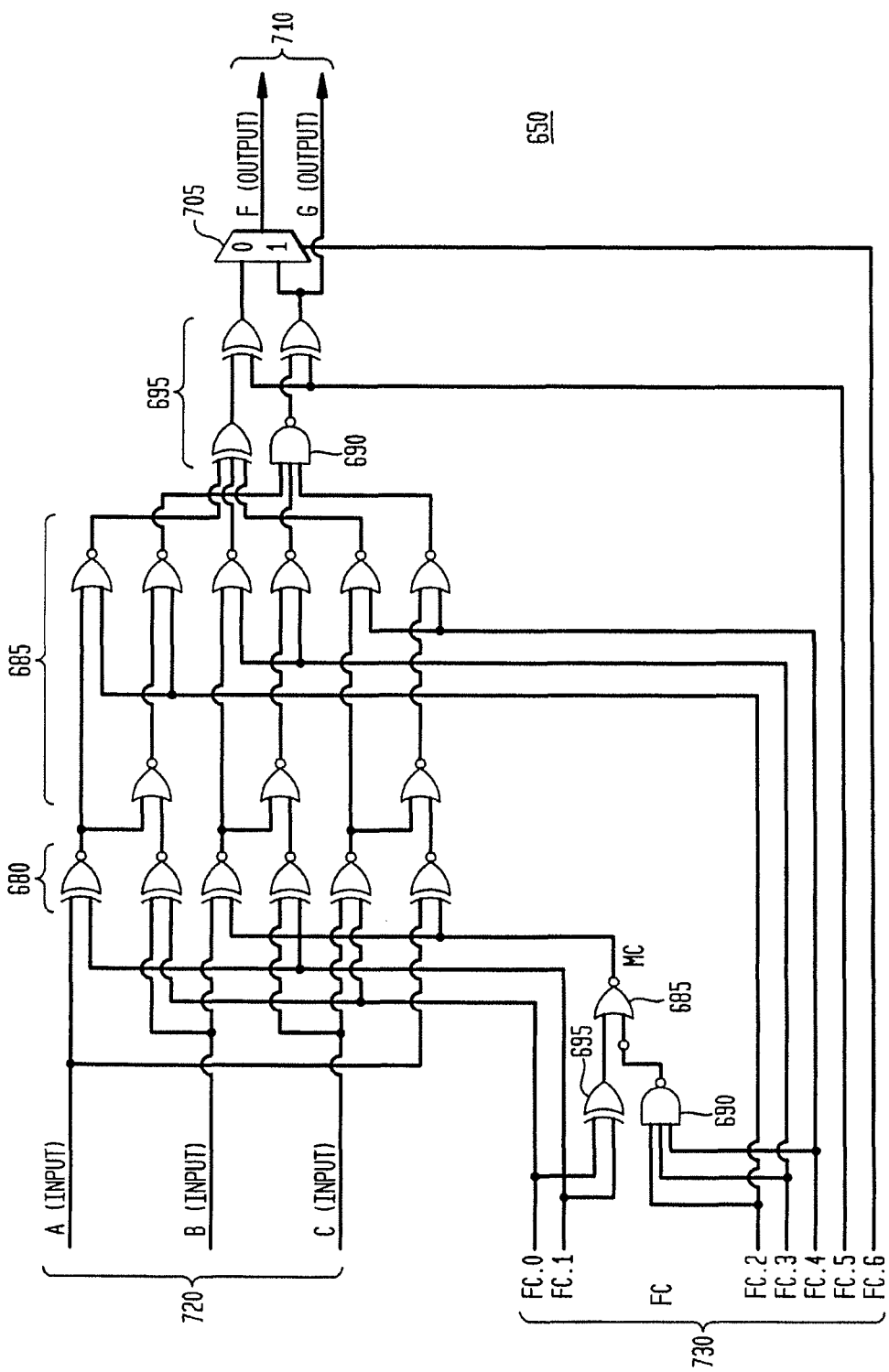
FIG. 9 is a block diagram illustrating, in greater detail, a preferred fixed computational element of a core cell of an adaptive logic processor computational unit, in accordance with the present invention.

FIG. 9 is a block diagram illustrating, in greater detail, a preferred fixed computational element 650 of a core cell 610 of an adaptive logic processor computational unit 600, in accordance with the present invention. The fixed computational element 650 is comprised of a fixed layout of pluralities of exclusive NOR (XNOR) gates 680, NOR gates 685, NAND gates 690, and exclusive OR (XOR) gates 695, with three inputs 720 and two outputs 710. Configuration and interconnection is provided through MUX 705 and interconnect inputs 730.

As may be apparent from the discussion above, this use of a plurality of fixed, heterogeneous computational elements (250), which may be configured and reconfigured to form heterogeneous computation units (200), which further may be configured and reconfigured to form heterogeneous matrices 150, through the varying levels of interconnect (110, 210, 240 and 220), creates an entirely new class or category of integrated circuit, which may be referred to as an adaptive computing architecture. It should be noted that the adaptive computing architecture of the present invention cannot be adequately characterized, from a conceptual or from a nomenclature point of view, within the rubric or categories of FPGAs, ASICs or processors. For example, the nonFPGA FPGA character of the adaptive computing architecture is immediately apparent because the adaptive computing architecture does not comprise either an array of identical logical units, or more simply, a repeating array of any kind. Also for example, the non-ASIC character of the adaptive computing architecture is immediately apparent because the adaptive computing architecture is not application specific, but provides multiple modes of functionality and is reconfigurable in real-time. Continuing with the example, the non-processor character of the adaptive computing architecture is immediately apparent because the adaptive computing architecture becomes configured, to directly operate upon data, rather than focusing upon executing instructions with data manipulation occurring as a byproduct.

Other advantages of the present invention may be further apparent to those of skill in the art. For mobile communications, for example, hardware acceleration for one or two algorithmic elements has typically been confined to infrastructure base stations, handling many (typically 64 or more) channels. Such as acceleration may be cost justified because increased performance and power savings per channel, performed across multiple channels, results in significant performance and power savings. Such multiple channel performance and power savings are not realizable, using prior art hardware acceleration, in a single operative channel mobile terminal (or mobile unit). In contrast, however, through use of the present invention, cost justification is readily available, given increased performance and power savings, because the same IC area may be configured and reconfigured to accelerate multiple algorithmic tasks, effectively generating or bringing into existence a new hardware accelerator for each next algorithmic element.

Yet additional advantages of the present invention may be further apparent to those of skill in the art. The ACE 100 architecture of the present invention effectively and efficiently combines and maximizes the various advantages of processors, ASICs and FPGAs, while minimizing potential disadvantages. The ACE 100 includes the programming flexibility of a processor, the post-fabrication flexibility of FPGAs, and the high speed and high utilization factors of an ASIC. The ACE 100 is readily reconfigurable, in real-time, and is capable of having corresponding, multiple modes of operation. In addition, through the selection of particular functions for reconfigurable acceleration, the ACE 100 minimizes power consumption and is suitable for low power applications, such as for use in hand-held and other battery-powered devices.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

What is claimed is:

1. An adaptive computing engine comprising:
   a first configurable computational unit including a first plurality of heterogeneous computational elements, the first plurality of heterogeneous computational elements including an adder, a register, and a function generator, the first plurality of heterogeneous computational elements coupled to each other via a first interconnection network to configure interconnections between the computational elements in response to configuration information to perform a first function;
   a second configurable computational unit for performing digital signal processing functions, the second computational unit including a second plurality of heterogeneous computational elements, the second plurality of heterogeneous computational elements including at least one multiplier computational element and at least one adder computational element, the second plurality of heterogeneous computational elements coupled to each other via a second interconnection network to configure the interconnections between the second plurality of heterogeneous computational elements in response to configuration information to perform a digital signal processing function; and
   a third interconnection network coupled between the first and second configurable computational units.

2. The adaptive computing engine of claim 1, wherein the third interconnection network sends the configuration information to the first and second interconnection networks.

3. The adaptive computing engine of claim 1, wherein the first and second interconnection networks include multiplexers coupled to the first and second pluralities of heterogeneous computational elements, the multiplexers routing data between the first and second pluralities of heterogeneous computational elements.

4. The adaptive computing engine of claim 3 wherein the first and second interconnection networks route control signals to control the multiplexers to switch data to the plurality of heterogeneous computational elements.

5. The adaptive computing engine of claim 1, wherein the interconnections of the first interconnection network to the first and second pluralities of heterogeneous computational elements have a greater density than the interconnections of the third interconnection network to the configurable computational units.

6. The adaptive computing engine of claim 1, wherein the first function is a logic function, arithmetic function or a register function.

7. The adaptive computing engine of claim 1, wherein the digital signal processing function is one of a fixed point arithmetic, floating point arithmetic, filtering, or transformation functions.

8. The adaptive computing engine of claim 1, wherein the function performed by the configurable computational unit is bit level manipulation and the digital signal processing function is bit or word level manipulation.

9. The adaptive computing engine of claim 1, wherein the adder computational elements are one of a plurality of adder computational elements, and wherein the multiplier computational elements are of a plurality of multiplier computational elements and wherein the second plurality of heterogeneous computational elements includes a plurality of arithmetic logical computational elements.

10. The adaptive computing engine of claim 9, wherein the second interconnection network changes the interconnections between the second plurality of heterogeneous computational elements to perform another digital signal processing function by bypassing at least one of the plurality of adder computational elements, or at least one of the plurality of multiplier computational elements or at least one of the plurality of arithmetic logical computational elements.

11. An adaptive integrated circuit comprising:
- a first plurality of heterogeneous computational elements, the first plurality of heterogeneous computational elements including an adder, a register, and a function generator, the first plurality of heterogeneous computational elements coupled to each other via a first interconnection network to configure interconnections between the heterogeneous computational elements in response to configuration information to perform a first function;
- a second plurality of heterogeneous computational elements, the second plurality of heterogeneous computational elements including a multiplier computational element and an adder computational element, the second plurality of heterogeneous computational elements coupled to each other via a second interconnection network to configure the interconnections between the second plurality of heterogeneous computational elements in response to configuration information to perform a digital signal processing function; and
- a third interconnection network coupled between at least some of the first and second heterogeneous computational elements.

12. The adaptive integrated circuit of claim 11, wherein the third interconnection network sends the configuration information to the first and second interconnection networks.

13. The adaptive integrated circuit of claim 11, wherein the first and second interconnection networks include multiplexers coupled to the first and second pluralities of heterogeneous computational elements, the multiplexers routing data between the first and second pluralities of heterogeneous computational elements.

14. The adaptive integrated circuit of claim 13 wherein the first and second interconnection networks route control signals to control the multiplexers to switch data to the plurality of heterogeneous computational elements.

15. The adaptive integrated circuit of claim 11, wherein the first function is a logic function, arithmetic function or a register function.

16. The adaptive integrated circuit of claim 11, wherein the digital signal processing function is one of a fixed point arithmetic, floating point arithmetic, filtering, or transformation functions.

17. An adaptive computing system comprising:
- a plurality of configurable computational units, each of the plurality of configurable computational units having multiple computational elements including an adder, a register, and a function generator, the computational elements coupled to each other via an interconnection network to configure interconnections between the computational elements in response to configuration information to perform a first function; and
- a plurality of configurable digital signal processing units, each the configurable digital signal processing units having multiple heterogeneous computational elements including a multiplier computational element and an adder computational element and an interconnection network coupled to the heterogeneous computational elements to configure the interconnections between the heterogeneous computational elements in response to configuration information to perform a digital signal processing function, wherein each of the plurality of configurable digital signal processing units is in communication with one of the plurality of configurable computational units.

18. The adaptive computing engine of claim 17, further comprising another interconnection network coupled to the plurality of configurable computational units and plurality of configurable digital signal processing units, the another interconnection network sending the configuration information to the interconnection networks of the plurality of configurable computational units and the plurality of digital signal processing units.

19. The adaptive computing engine of claim 17, wherein the interconnections of the interconnection networks of the plurality of configurable computational units and the plurality of digital signal processing units have a greater density than the interconnections of the another interconnection network to the configurable computational units and the digital signal processing units.

20. The adaptive computing engine of claim 17, wherein the interconnection networks include multiplexers coupled to the computational elements, the multiplexers routing data between the pluralities of computational elements.

21. The adaptive computing engine of claim 17, wherein the first function is a logic function, arithmetic function or a register function.

22. The adaptive computing engine of claim 17, wherein the digital signal processing function is one of a fixed point arithmetic, floating point arithmetic, filtering, or transformation functions.

* * * * *